US012731532B2

(12) United States Patent
Park et al.

(10) Patent No.: US 12,731,532 B2
(45) Date of Patent: Sep. 8, 2026

(54) DISPLAY DEVICE AND CONTROLLING METHOD THEREOF

(71) Applicant: SAMSUNG ELECTRONICS CO., LTD., Suwon-si (KR)

(72) Inventors: Wonkeun Park, Suwon-si (KR); Youngki Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/984,530

(22) Filed: Dec. 17, 2024

(65) Prior Publication Data

US 2025/0118249 A1 Apr. 10, 2025

Related U.S. Application Data

(63) Continuation of application No. PCT/KR2023/007361, filed on May 30, 2023.

(30) Foreign Application Priority Data

Jul. 27, 2022 (KR) ........................ 10-2022-0093538

(51) Int. Cl.
*G09G 3/32* (2016.01)

(52) U.S. Cl.
CPC ....... *G09G 3/32* (2013.01); *G09G 2300/0852* (2013.01); *G09G 2310/08* (2013.01); *G09G 2320/0257* (2013.01)

(58) Field of Classification Search
CPC . G09G 3/2007–204; G09G 3/32–3291; G09G 2300/0809; G09G 2300/0819;
(Continued)

(56) References Cited

U.S. PATENT DOCUMENTS 8,194,063 B2 6/2012 Levey et al.
10,832,615 B2 11/2020 Kim et al.
(Continued)

FOREIGN PATENT DOCUMENTS

CN 114743505 A 7/2022
KR 10-1301111 B1 8/2013
(Continued)

OTHER PUBLICATIONS

Communication dated May 16, 2025, issued by the European Patent Office in European Application No. 23846779.9.
(Continued)

*Primary Examiner* — Nathan Danielsen
(74) *Attorney, Agent, or Firm* — Sughrue Mion, PLLC

(57) ABSTRACT

A display device is provided. The display device includes a display panel including a pixel array including pixels arranged in a plurality of row lines and including a plurality of inorganic light-emitting elements, and sub-pixel circuits corresponding to inorganic light-emitting elements 120 of the pixel array, and a driver configured to set an image data voltage corresponding to an image frame in units of the plurality of row lines in the sub-pixel circuits, set a reset voltage in units of the plurality of row lines in an anode terminal of the inorganic light-emitting elements, and drive the sub-pixel circuits so that the inorganic light-emitting elements emit light based on the set image data voltage and reset voltage.

15 Claims, 17 Drawing Sheets

(58) Field of Classification Search

CPC ... G09G 2300/0842; G09G 2300/0852; G09G 2310/0243–0251; G09G 2310/027–0275; G09G 2310/06; G09G 2310/08; G09G 2320/0233; G09G 2320/0242; G09G 2320/0257; G09G 2320/04

See application file for complete search history.

(56) References Cited

U.S. PATENT DOCUMENTS

| | | | | |
|---|---|---|---|---|
| 10,916,198 | B2 | 2/2021 | Lin et al. | |
| 11,495,171 | B2 | 11/2022 | Kim et al. | |
| 11,694,601 | B2 | 7/2023 | Hussell | |
| 12,002,412 | B2 | 6/2024 | Kim et al. | |
| 2008/0218449 | A1* | 9/2008 | Oh | G09G 3/3233 345/76 |
| 2017/0124954 | A1* | 5/2017 | Park | G09G 3/3233 |
| 2018/0330668 | A1* | 11/2018 | Luo | H10K 59/1216 |
| 2019/0304369 | A1 | 10/2019 | Li et al. | |
| 2020/0111403 | A1* | 4/2020 | Kim | G09G 3/2081 |
| 2022/0335872 | A1* | 10/2022 | Zhang | G09G 3/3233 |
| 2023/0230536 | A1 | 7/2023 | Kim et al. | |
| 2023/0237958 | A1 | 7/2023 | Kim et al. | |
| 2025/0201196 | A1* | 6/2025 | Han | G09G 3/3258 |

FOREIGN PATENT DOCUMENTS

| | | | |
|---|---|---|---|
| KR | 10-2019-0137658 | A | 12/2019 |
| KR | 10-2151099 | B1 | 9/2020 |
| KR | 10-2020-0144041 | A | 12/2020 |
| KR | 10-2020-0144050 | A | 12/2020 |
| KR | 10-2021-0087867 | A | 7/2021 |
| KR | 10-2021-0131852 | A | 11/2021 |
| KR | 10-2022-0012228 | A | 2/2022 |
| KR | 10-2022-0037329 | A | 3/2022 |
| KR | 10-2022-0045501 | A | 4/2022 |
| KR | 10-2022-0045511 | A | 4/2022 |
| KR | 10-2022-0060457 | A | 5/2022 |
| WO | 2020/009501 | A1 | 1/2020 |
| WO | 2022/097934 | A1 | 5/2022 |

OTHER PUBLICATIONS

Communication dated May 16, 2025, issued by the Korean Intellectual Property Office in Korean Application No. 10-2022-0093538.

International Search Report and Written Opinion issued Sep. 15, 2023 by the International Searching Authority in International App. No. PCT/KR2023/007361.

* cited by examiner

DISPLAY DEVICE AND CONTROLLING METHOD THEREOF

CROSS-REFERENCE TO RELATED APPLICATIONS

This application is a bypass continuation application of International Application No. PCT/KR2023/007361 designating the United States, filed on May 30, 2023, in the Korean Intellectual Property Receiving Office and claiming priority to Korean Patent Application No. 10-2022-0093538, filed on Jul. 27, 2022, in the Korean Intellectual Property Office, the disclosures of which are incorporated by reference herein in their entireties.

BACKGROUND

1. Field

The disclosure relates to a display device and a controlling method thereof, and more particularly to, a display device including a pixel array consisting of inorganic light-emitting elements.

2. Description of Related Art

Recently, Light-emitting Diode (LED) display panels are being developed. The related art LED display panels have been dominated by Passive Matrix (PM) driving, but Active Matrix (AM) driving is required for power saving.

AM driving circuits are applied to Organic Light-emitting Diode (OLED) display panels, but unlike OLED, LEDs have a larger color shift phenomenon according to the forward voltage (Vf) deviation between LEDs or the magnitude of driving current than OLEDs, making it difficult to directly apply the AM driving circuits applied to OLED displays to LED displays.

Therefore, it is necessary to develop a driving method for LED display panels that can improve color reproducibility.

SUMMARY

According to an aspect of the disclosure, there is provided a display device including: a display panel including: a pixel array in which pixels including a plurality of inorganic light-emitting elements are disposed in a plurality of row lines; and sub-pixel circuits corresponding to inorganic light-emitting elements of the pixel array, respectively; and a driver configured to: set an image data voltage corresponding to an image frame in sub-pixels of the plurality of row lines in the sub-pixel circuits; set a reset voltage in the sub-pixels of the plurality of row lines in an anode terminal of the inorganic light-emitting elements; and drive the sub-pixel circuits so that an inorganic light-emitting element, of the inorganic light-emitting elements, emits light based on the set image data voltage and the reset voltage, wherein the reset voltage is a voltage for compensating for at least one of an electrical characteristic deviation of the inorganic light-emitting element or a ground voltage deviation applied to a cathode terminal of the inorganic light-emitting elements.

The reset voltage may be applied to the anode terminal of the inorganic light-emitting element through a line separate from a line through which the image data voltage is applied.

The driver may include: a first data driver providing the image data voltage; and a second data driver providing the reset voltage.

Each of the sub-pixel circuits may include a reset transistor that applies the reset voltage provided from the second data driver to the anode terminal of the inorganic light-emitting elements while turned on.

The driver may be configured to set the image data voltage in the sub-pixels of the plurality of row lines in the sub-pixel circuits by applying a scan signal in the sub-pixels of the plurality of row lines; and wherein the reset transistor may be turned on based on the scan signal.

The driver may be configured to: set the image data voltage in the sub-pixels of the plurality of row lines in the sub-pixel circuits by applying a first scan signal in the sub-pixels of the plurality of row lines; and turn on the reset transistor in the sub-pixels of the plurality of row lines by applying a second scan signal separate from the first scan signal in the sub-pixels of the plurality of row lines.

The reset voltage set in the anode terminal of the inorganic light-emitting element may be maintained by parasitic capacitance formed between the anode terminal and the cathode terminal of each inorganic light-emitting element until each inorganic light-emitting element emits light.

The inorganic light-emitting element may be configured to emit light according to driving current provided from the sub-pixel circuits, and wherein each of the sub-pixel circuits may include at least one of a Pulse Amplitude Modulation (PAM) circuit for controlling a magnitude of the driving current based on the image data voltage or a Pulse Width Modulation (PWM) circuit for controlling a pulse width of the driving current based on the image data voltage.

The PAM circuit may include a first drive transistor and the PWM circuit may include a second drive transistor, and wherein a first threshold voltage of the first drive transistor may be compensated when the image data voltage is set in the sub-pixel circuits, and wherein a second threshold voltage of the second drive transistor may be compensated when the image data voltage is set in the sub-pixel circuits.

According to an aspect of the disclosure, there is provided a controlling method of a display device, wherein the display device includes a display panel including a pixel array in which pixels including a plurality of inorganic light-emitting elements are disposed in a plurality of row lines, and sub-pixel circuits corresponding to inorganic light-emitting elements of the pixel array, respectively, wherein the controlling method includes: setting an image data voltage corresponding to an image frame in sub-pixels of the plurality of row lines in the sub-pixel circuits, and setting a reset voltage in the sub-pixels of the plurality of row lines in an anode terminal of the inorganic light-emitting elements; and driving the sub-pixel circuits so that an inorganic light-emitting element, of the plurality of inorganic light-emitting elements, emits light based on the set image data voltage and the reset voltage, wherein the reset voltage is a voltage for compensating for at least one of an electrical characteristic deviation of the inorganic light-emitting element or a ground voltage deviation applied to a cathode terminal of the inorganic light-emitting elements.

The reset voltage may be applied to the anode terminal of the inorganic light-emitting element through a line separate from a line through which the image data voltage is applied.

The display device may include: a first data driver providing the image data voltage; and a second data driver providing the reset voltage.

Each of the sub-pixel circuits may include a reset transistor that applies the reset voltage provided from the second data driver to the anode terminal of the inorganic light-emitting elements while turned on.

The setting may include: applying a scan signal in the sub-pixels of the plurality of row lines to set the image data voltage in the sub-pixels of the plurality of row lines in the sub-pixel circuits; and wherein the reset transistor may be turned on based on the scan signal.

The setting may include: applying a first scan signal in the sub-pixels of the plurality of row lines to set the image data voltage in the sub-pixels of the plurality of row lines in the sub-pixel circuits; and applying a second scan signal separate from the first scan signal in the sub-pixels of the plurality of row lines to turn on the reset transistor in the sub-pixels of the plurality of row lines.

BRIEF DESCRIPTION OF THE DRAWINGS

The above and other aspects and/or features of one or more embodiments of the disclosure will be more apparent from the following detailed description, taken in conjunction with the accompanying drawings, in which.

DETAILED DESCRIPTION

In describing the one or more embodiments, when a detailed description for a related known technology may unnecessarily obscure the gist of the disclosure, the detailed description may be omitted. In addition, duplicate descriptions of the same configuration will be omitted as much as possible.

Hereinafter, the suffix "~er" for components used in the following description is given or used interchangeably only for the convenience of writing the specification, and does not have a distinct meaning or role in itself.

The terms used in this disclosure are used to describe embodiments, and are not intended to limit and/or restrict this disclosure. Singular expressions include plural expressions unless the context clearly indicates otherwise.

In the disclosure, it should be understood that the expressions "have", "include", etc. indicate existence of features, numbers, steps, operations, components, parts, or a combination thereof described in the specification, but do not preclude the possibility of the presence or addition of one or more other features, numbers, steps, operations, components, parts, or a combination thereof.

Expressions "first", "second", "1st," "2nd," or the like, used in the disclosure may indicate various components regardless of sequence and/or importance of the components, will be used only in order to distinguish one component from the other components, and do not limit the corresponding components.

Meanwhile, in the present disclosure, when it is described that an element (e.g., a first element) is "connected to" another element (e.g., a second element), it should be understood that the element (e.g., a first element) is directly connected to the another element (e.g., a second element), or the element (e.g., a first element) is directly connected to the another element (e.g., a second element) through an intervening element (e.g., a third element).

On the other hand, when it is described that an element (e.g., a first element) is "directly connected to" another element (e.g., a second element), it should be understood that there is no intervening element (e.g., a third element) between the element (e.g., a first element) and the another element (e.g., a second element).

The terms used in the embodiments of the present disclosure may be interpreted as having the meaning commonly known to those skilled in the art, unless otherwise defined.

Hereinafter, various embodiments of the present disclosure will be described in detail with reference to the accompanying drawings.

Figure 1:
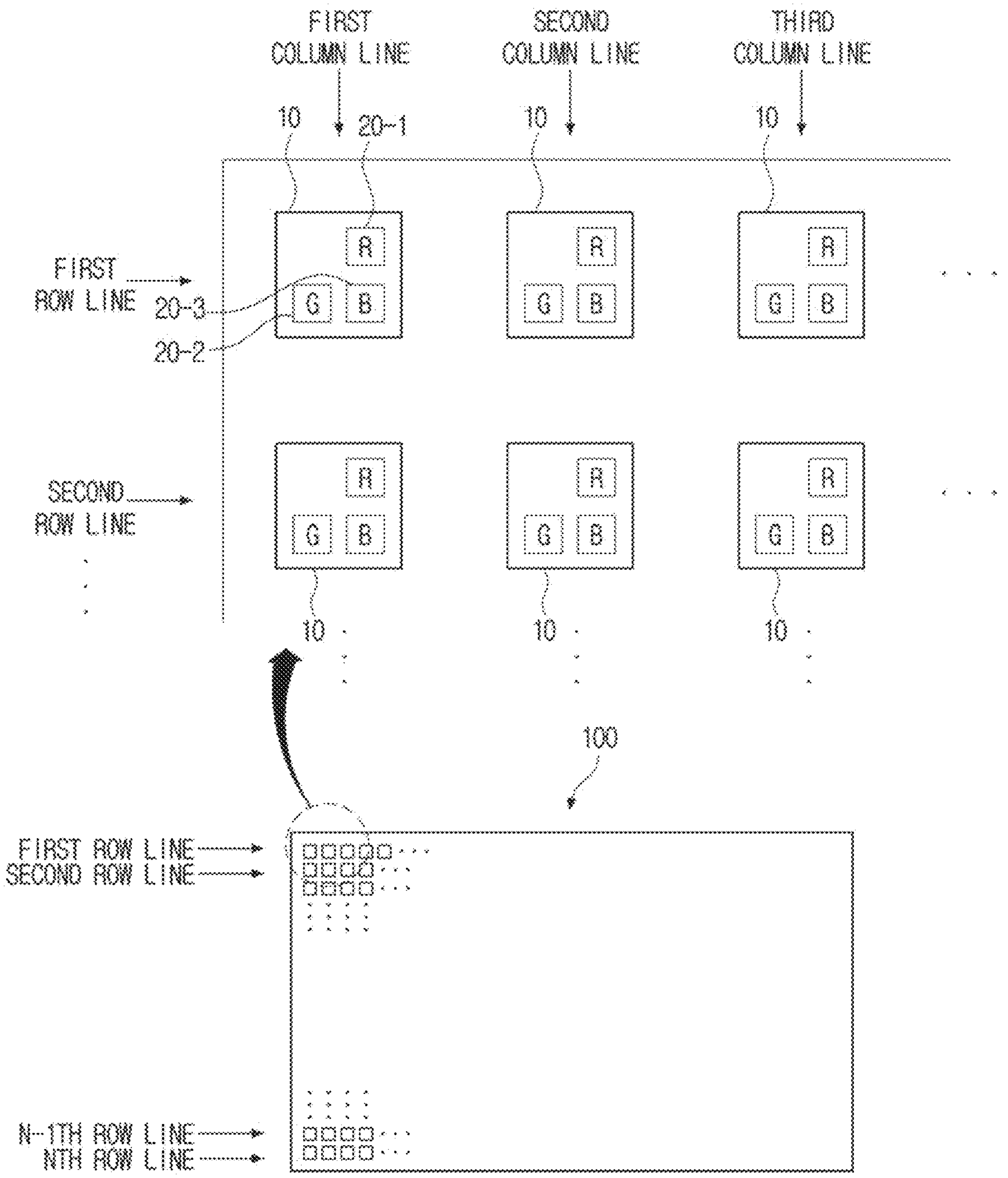
FIG. 1 is a view provided to explain a pixel structure of a display panel according to an embodiment.

FIG. 1 is a view provided to explain a pixel structure of a display panel according to an embodiment.

Referring to FIG. 1, a display panel 100 includes a plurality of pixels 10 disposed (or arranged) in a matrix form, i.e., a pixel array.

The pixel array includes a plurality of row lines or a plurality of column lines. In some cases, the row lines may be referred to as horizontal lines, scan lines, or gate lines, and the column lines may be referred to as vertical lines or data lines.

Further, in some cases, the terms such as row line, column line, horizontal line, and vertical line may be used to refer to the lines formed by pixels on the pixel array, and the terms such as scan line, gate line, and data line may be used to refer to the actual wiring on the display panel 100 through which data or signals are transmitted.

Meanwhile, each pixel 10 of the pixel array may include three kinds of sub-pixels such as a red (R) sub-pixel 20-1, a green (G) sub-pixel 20-2, and a blue (B) sub-pixel 20-3.

In this case, each pixel 10 may include a plurality of inorganic light-emitting elements constituting the sub-pixels 20-1, 20-2, 20-3.

For example, each pixel 10 may include three kinds of inorganic light-emitting elements such as R inorganic light-emitting elements constituting the R sub-pixel 20-1, G inorganic light-emitting elements constituting the G sub-pixel 20-2, and B inorganic light-emitting elements constituting the B sub-pixel 20-3.

Alternatively, each pixel 10 may include three blue inorganic light-emitting elements. In this case, each inorganic light-emitting element may be provided with a color filter for implementing the R, G, and B colors. In this case, the color filter may be, but is not limited to, a quantum dot (QD) color filter.

FIG. 1 illustrates an example in which the sub-pixels 20-1 to 20-3 are arranged in an L-shape with the left and right sides reversed within a single pixel region. However, the embodiment is not limited thereto, and the R, G, and B sub-pixels 20-1 to 20-3 may be arranged in a row within the pixel region, or may be arranged in various other shapes depending on the embodiment.

Further, in FIG. 1, it is described that, as an example, three kinds of sub-pixels constitutes a single pixel. However, depending on the embodiment, four kinds of sub-pixels, such as R, G, B, and W (white), may constitute a pixel, or any other number of sub-pixels may constitute a pixel.

Meanwhile, although not specifically shown in FIG. 1, a sub-pixel circuit for driving an inorganic light-emitting element may be provided for each inorganic light-emitting element in the display panel 100.

The sub-pixel circuit may provide driving current to a corresponding inorganic light-emitting element based on an image data voltage applied from the outside. The inorganic light-emitting element may express the grayscale of an image by emitting light with various luminance according to the magnitude and/or pulse width of the driving current.

According to an embodiment, the sub-pixel circuit may control the magnitude of the driving current based on the image data voltage. The method of controlling the magnitude of the driving current to express the grayscale of the image is referred to as a pulse amplitude modulation (PAM) driving method. The sub-pixel circuit may include a PAM circuit for driving a corresponding inorganic light-emitting element in the PAM driving method. The image data voltage applied to the PAM circuit may be referred to as a PAM data voltage. In the PAM driving method, the pulse width of the driving current may be constant.

In addition, according to an embodiment, the sub-pixel circuit may control the pulse width (or driving time) of the driving current based on the image data voltage. The method of controlling the pulse width (driving time or duty ratio) of the driving current to express the grayscale of the image is referred to as a pulse width modulation (PWM) driving method. The sub-pixel circuit may include a PWM circuit for driving a corresponding inorganic light-emitting element in the PWM driving method. The image data voltage applied to the PWM circuit may be referred to as a PWM data voltage. In the PWM driving method, the magnitude of the driving current may be constant.

Further, according to an embodiment, the sub-pixel circuit may control the magnitude and the pulse width of the driving current based on the image data voltage. In this case, the sub-pixel circuit may include both the PAM circuit and the PWM circuit. In addition, in this case, the image data voltage may include the PAM data voltage and the PWM data voltage.

Meanwhile, the sub-pixel circuits included in each row line of the display panel 100 may be operated in the order of "setting (or programming) an image data voltage" and "providing driving current based on the set image data voltage".

Figure 2A:
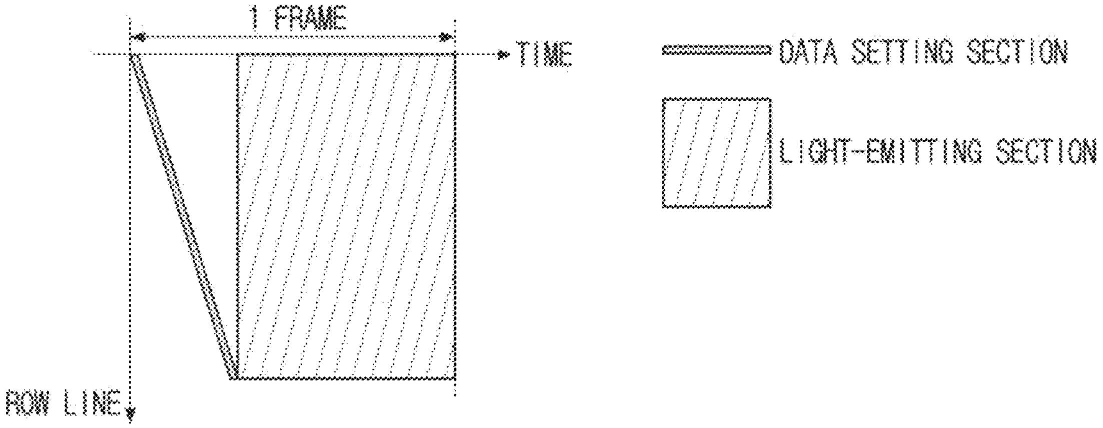
FIG. 2A is a concept view illustrating a driving method of a display panel according to an embodiment.
Figure 2B:
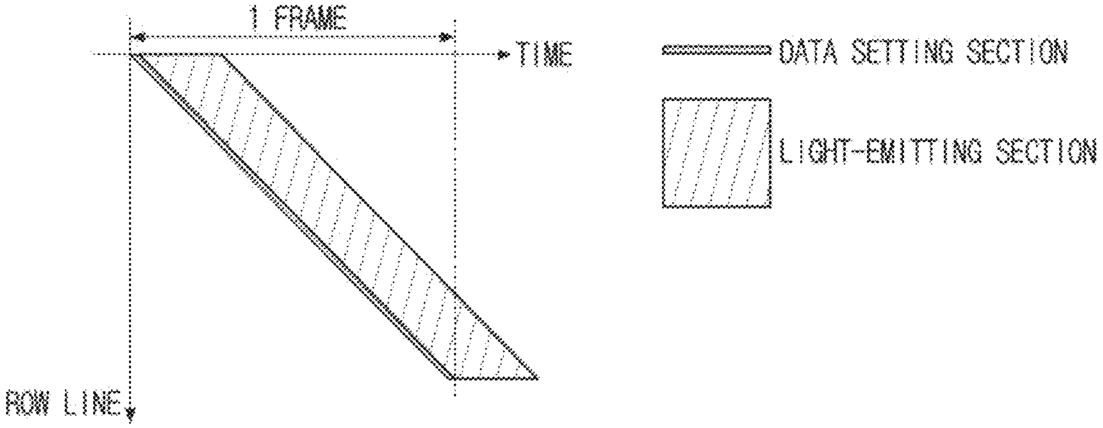
FIG. 2B is a concept view illustrating a driving method of a display panel according to an embodiment.
Figure 2C:
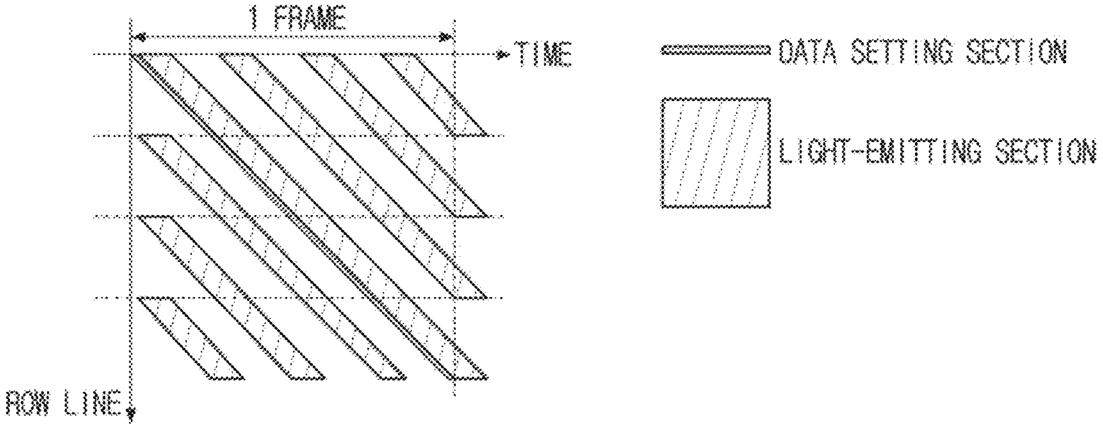
FIG. 2C is a concept view illustrating a driving method of a display panel according to an embodiment.

FIGS. 2A to 2C are concept views illustrating a driving method of the display panel 100 according to various embodiments.

FIGS. 2A to 2C illustrate a driving method of the display panel 100 during one image frame time. In FIGS. 2A to 2C, the vertical axis represents the row line of the display panel 100 and the horizontal axis represents time.

In addition, the data setting section represents a driving section of the display panel 100 in which the image data voltage is set in the sub-pixel circuits included in each row line. During the data setting section, a control signal (hereinafter, referred to as a scan signal) for setting the image data voltage may be applied to the sub-pixel circuits in units of a row line.

Further, the light-emitting section indicates a driving section of the display panel 100 in which the sub-pixel circuits included in each row line provide driving current to the inorganic light-emitting elements based on the image data voltage set in the data setting section. During the light-emitting section, a control signal (hereinafter, referred to as an emission signal) for controlling the operation of providing the driving current of the sub-pixel circuits may be applied to the sub-pixel circuits according to the driving method.

The inorganic light-emitting elements emit according to the driving current within the light-emitting section.

Referring to FIG. 2A, it can be seen that after the data setting section is performed for the entire row line in the row line order, the light-emitting section for the entire row line is performed at once. In the case of the example illustrated in FIG. 2B, the data setting section is performed for the entire row line in the row line order, which is the same as FIG. 2A, but it is different from FIG. 2A in that the light-emitting section is also performed in the row line order. In the case of the example illustrated in FIG. 2C, it is different from FIG. 2B in that the light-emitting section is performed multiple times for each row line.

Figure 3:
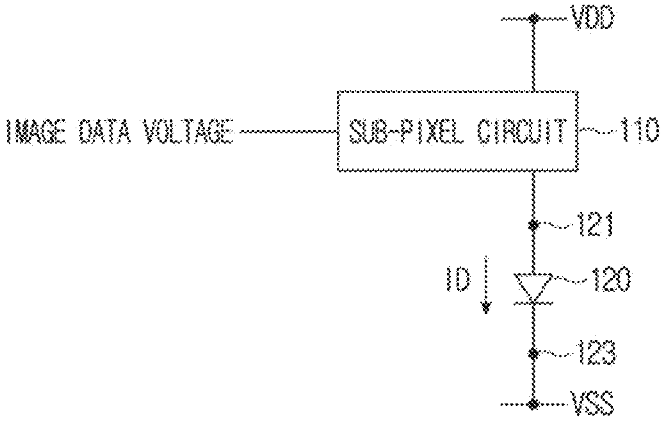
FIG. 3 is a concept view illustrating configuration related to one sub-pixel included in a display panel according to an embodiment.

FIG. 3 is a concept view illustrating configuration related to one sub-pixel included in the display panel 100 according to an embodiment. According to FIG. 3, the sub-pixel may include a sub-pixel circuit 110 and an inorganic light-emitting element 120.

The sub-pixel circuit 110 may provide driving current (Id) to the inorganic light-emitting element 120 based on an image data voltage applied from an external data driver. In this case, the magnitude and/or pulse width of the driving current (Id) may be controlled according to the image data voltage.

An anode terminal 121 of the inorganic light-emitting element 120 may be connected to the sub-pixel circuit 110, and a cathode terminal 123 may be connected to a ground terminal of the display panel 100. A ground voltage VSS is applied to the ground terminal of the display panel 100.

When a voltage equal to or greater than the forward voltage Vf is applied between the anode terminal 121 and the cathode terminal 123, the driving current (Id) flows through the inorganic light-emitting element 120, and the inorganic light-emitting element 120 emits light. In this case, the luminance of the light emitted by the inorganic light-emitting element 120 may vary depending on the magnitude and/or pulse width of the driving current (Id) provided by the sub-pixel circuit 110.

When the driving current (Id) flows, a driving voltage VDD may be applied to the anode terminal 121 of the inorganic light-emitting element 120. Since the difference between the driving voltage VDD and the ground voltage VSS is greater than the forward voltage Vf of the inorganic light-emitting element 120, the driving current (Id) may flow through the inorganic light-emitting element 120.

Figure 4:
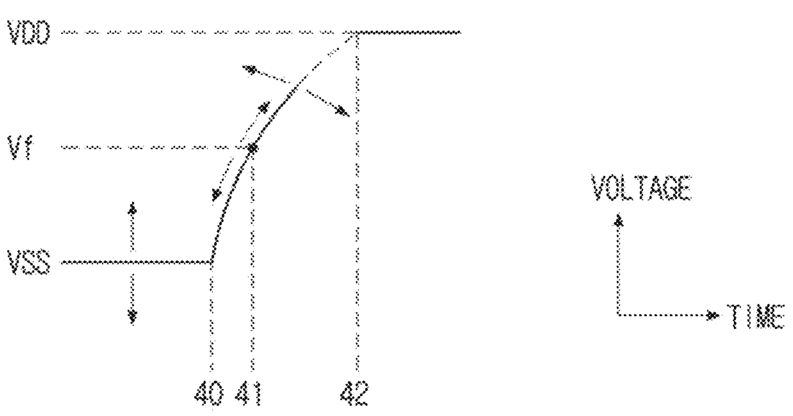
FIG. 4 is a view illustrating a voltage change of an anode terminal of an inorganic light-emitting element according to an embodiment.

FIG. 4 is a view illustrating a voltage change of the anode terminal 121 of the inorganic light-emitting element 120 according to an embodiment. In FIG. 4, the horizontal axis represents time and the vertical axis represents voltage.

The actual voltage of the anode terminal 121 of the inorganic light-emitting element 120 does not immediately become the driving voltage VDD at the time 40 when the driving voltage VDD is applied, but rather reaches the driving voltage VDD after a certain period of time has elapsed. Referring to FIG. 4, when the driving voltage VDD is applied at the time of reference 40, the voltage of the anode terminal 121 of the inorganic light-emitting element 120 starts to rise from the ground voltage VSS. Subsequently, the voltage of the anode terminal 121 rises to the forward voltage Vf of the inorganic light-emitting element 120 at the time of reference 41, and can be seen to reach the driving voltage VDD at the time of reference 42.

In this case, as described above, the inorganic light-emitting element 120 is turned on when a voltage equal to or greater than the forward voltage Vf is applied between the anode terminal 121 and the cathode terminal 123. Accordingly, as shown by the arrows in FIG. 4, it can be seen that when the forward voltage Vf changes, the gradient at which the voltage increases (hereinafter, referred to as the charging gradient) changes, or the ground voltage VSS changes, the point in time 41 at which the inorganic light-emitting element 120 turns on changes.

In practice, the forward voltage Vf or charging gradient is an inherent electrical characteristic of the inorganic light-emitting element 120, and may vary from one inorganic light-emitting element 120 to another due to process variations and the like. In addition, the ground voltage VSS may also vary depending on the location of the display panel 100.

These deviations may cause differences in the point in time at which the inorganic light-emitting element 120 is turned on, which may be problematic as it can be recognized as a stain on the display 100 when expression grayscale (especially, low grayscale).

According to an embodiment, a reset voltage may be set in the anode terminal 121 of each inorganic light-emitting element 120 when driving the display panel 100. In this case, the reset voltage, as a kind of data voltage to compensate for the deviations described above, may be provided to each sub-pixel circuit 110 through a data driver separate from the data driver for providing the image data voltage.

For example, the reset voltage may be a voltage to compensate for at least one of a deviation in the electrical characteristics of the inorganic light-emitting element 120 or a deviation in the ground voltage VSS applied to the inorganic light-emitting element. In other words, the reset voltage may be a voltage to compensate for a deviation in the forward voltage Vf of the inorganic light-emitting element 120. Alternatively, the reset voltage may be a voltage to compensate for a deviation in the charging gradient of the inorganic light-emitting element 120. Alternatively, the reset voltage may be a voltage to compensate for a deviation in the ground voltage VSS applied to the inorganic light-emitting element 120. Alternatively, the reset voltage may be a voltage to compensate for a deviation in the forward voltage Vf of the inorganic light-emitting element 120 and a deviation in the charging gradient. Alternatively, the reset voltage may be a voltage to compensate for a deviation in the forward voltage Vf of the inorganic light-emitting element 120 and a deviation in the ground voltage VSS applied to the inorganic light-emitting element 120. Alternatively, the reset voltage may be a voltage to compensate for a deviation in the charging gradient of the inorganic light-emitting element 120 and a deviation in the ground voltage VSS applied to the inorganic light-emitting element 120. Alternatively, the reset voltage may be a voltage to compensate for a deviation in the forward voltage Vf of the inorganic light-emitting element 120, a deviation in the charging gradient, and a deviation in the ground voltage VSS applied to the inorganic light-emitting element 120.

When the driving voltage VDD is applied while the reset voltage is set, the voltage of the anode terminal 120 of the inorganic light-emitting element 120 rises from the reset voltage, so by setting the reset voltage appropriately, the problem caused by the deviations described above can be solved.

For example, the reset voltage may be obtained by measuring or calculating the voltage value at which the resulting stain is removed after displaying a monochromatic test image on the display panel 100. Specifically, a low-grayscale monochromatic test image may be displayed on the display panel 100, and a voltage value applied to the anode terminal 121 of the inorganic light-emitting element 120 may be adjusted so that the luminance of the image is as uniform as possible. In this case, the adjusted voltage value may be obtained as a reset voltage value for the corresponding grayscale, but is not limited thereto. The reset voltage obtained as described above may be stored in a display device including the display panel 100, and may be used when displaying an image thereafter.

Figure 5:
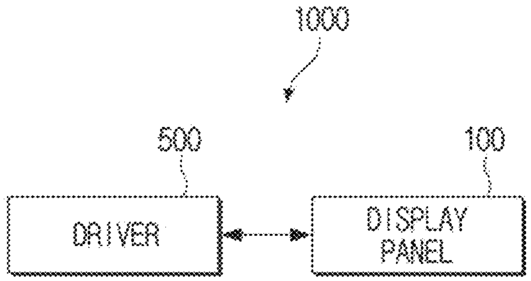
FIG. 5 is a block diagram of a display device according to an embodiment.

FIG. 5 is a block diagram of a display device 1000 according to an embodiment. Referring to FIG. 5, the display device 1000 includes the display panel 100 and a driver 500.

The display panel 100 includes a pixel array as described above in FIG. 1, and may display an image corresponding to an applied image data voltage.

Each sub-pixel circuit 110 included in the display panel 100 may provide driving current, the magnitude and/or pulse width of which is controlled based on the image data voltage applied from the driver 500, to the corresponding inorganic light-emitting element 120.

The inorganic light-emitting elements 120 constituting the pixel array may emit light according to the driving current provided from the corresponding sub-pixel circuit 110, thereby allowing an image to be displayed on the display panel 100.

The driver 500 drives the display panel 100. The driver 500 may drive the display panel 100 by providing various control signals, data signals, driving voltages, and the like to the display panel 100.

In particular, the driver 500 may set an image data voltage corresponding to an image frame in the sub-pixel circuits 110 in units of a row line, and may set a reset voltage in the anode terminals 121 of the inorganic light-emitting elements 120 in units of a row line.

In addition, the driver 500 may drive the sub-pixel circuits 110 such that the inorganic light-emitting elements 120 emit light based on the set image data voltage and reset voltage.

To this end, the driver 500 may include at least one gate driver for driving the pixels on the pixel array in units of a row line. The gate driver may drive the pixels on the pixel array in units of a row line by providing various gate signals to the display panel 100 in units of a row line.

In this case, the gate signal may include, but is not limited to, a scan signal for setting an image data voltage to the sub-pixel circuit 110 or a reset voltage to an anode terminal of the inorganic light-emitting element 120, and an emission signal for controlling a driving current providing operation of the sub-pixel circuit 110 (i.e., a light-emitting operation of the inorganic light-emitting element 120).

In addition, the driver 500 may include at least one source driver (or data driver) for providing an image data voltage (e.g., PAM data voltage and/or PWM data voltage) or a reset voltage to each pixel (or each sub-pixel) of the display panel 100.

Further, the driver 500 may include a demux circuit for selecting each of the plurality of sub-pixels 20-1 to 20-3 included in the one pixel 10.

The driver 500 may also include a power IC for providing various DC voltages (e.g., first driving voltage (VDD-_PAM), second driving voltage (VDD_PWM), ground voltage VSS, etc., to be described later) to each sub-pixel circuit 110 included in the display panel 100.

In addition, the driver 500 may include a level shifter for converting the levels of various signals provided by a timing controller (TCON) to levels available in the drivers described above (e.g., gate drivers or data drivers) or display panel 100.

Meanwhile, according to an embodiment, at least some of the various components described above that can be included in the driver 500 may be disposed on a printed circuit board (PCB) separate from the display panel 100, and may be connected to the sub-pixel circuits formed in the TFT layer of the display panel 100 through film-on-glass (FOG) wiring.

Alternatively, at least some of the various components described above may be disposed on a film in the form of a chip on film (COF), and may be connected to the sub-pixel circuits formed in the TFT layer of the display panel 100 through film on glass (FOG) wiring.

Alternatively, at least some of the various components described above may be disposed on the back side of the glass substrate (to be described later) (the side opposite to the side where the TFT layer is formed based on the glass substrate) of the display panel (100) in the form of a Chip On Glass (COG), and may be connected to the sub-pixel circuits formed in the TFT layer of the display panel 100 through connection wiring.

Alternatively, at least some of the various components described above may be formed in the TFT layer together with sub-pixel circuits formed in the TFT layer within the display panel 100, and may be connected to the sub-pixel circuits.

For example, among the various components described above, the gate driver and de-mux circuit may be formed within the TFT layer of the display panel 100, the data driver may be disposed on the back side of the glass substrate of the display panel 100 in the form of a COG, the level shifter may be disposed on a film in the form of a COF, and the power IC and timing controller may be disposed on a separate external printed circuit board (PCB), but are not limited thereto.

Meanwhile, according to an embodiment, the display device 1000, as a single unit, may be applied to a wearable device, a portable device, a handheld device, and various electronic or electrical products requiring a display.

In addition, according to an embodiment, the display device 1000 may be a single display module. In this case, a plurality of display modules may be combined or assembled to form a single display panel. As such, a single display panel in which a plurality of display modules are combined may be referred to as a "modular display panel." However, the name is not limited thereto. In this case, each display module becomes a component that constitutes the modular display panel. The modular display panel may be applied to a small display product such as a monitor, a TV, etc. or a large display product such as digital signage, an electronic displays, etc.

Figure 6A:
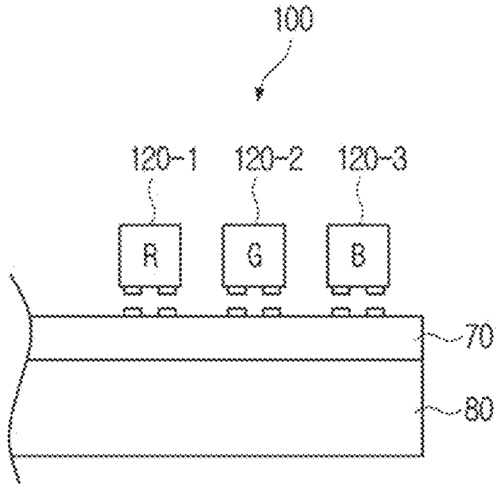
FIG. 6A is a cross-sectional view of a display panel according to an embodiment.

FIG. 6A is a cross-sectional view of the display panel 100 according to an embodiment. FIG. 6A illustrates only one pixel included in the display panel 100 for convenience of explanation.

Referring to FIG. 6A, the display panel 100 may include a glass substrate 80, a TFT layer 70, and inorganic light-emitting elements R, G, B (120-1, 120-2, 120-3). In this case, the sub-pixel circuit 110 described above may be implemented as a thin film transistor (TFT) and included in the TFT layer 70 on the glass substrate 80.

Each of the inorganic light-emitting elements R, G, B (120-1, 120-2, 120-3) may be mounted on the TFT layer 70 for electrical connection with the corresponding sub-pixel circuit 110 to form a sub-pixel as described above.

The TFT layer 70 has the sub-pixel circuit 110 for providing driving current to the inorganic light-emitting elements 120-1, 120-2, 120-3 for each of the inorganic light-emitting elements 120-1, 120-2, 120-3, and each of the inorganic light-emitting elements 120-1, 120-2, 120-3 may be mounted or disposed on the TFT layer 70 such that each of the inorganic light-emitting elements 120-1, 120-2, 120-3 is electrically connected to the corresponding sub-pixel circuit 110.

Meanwhile, in FIG. 6A, the inorganic light-emitting elements R, G, B (120-1, 120-2, 120-3) are illustrated as micro LEDs of a flip chip type. However, the inorganic light-emitting elements R, G, B (120-1, 120-2, 120-3) are not limited thereto, and depending on the embodiment, the inorganic light-emitting elements R, G, B (120-1, 120-2, 120-3) may be micro LEDs of a lateral type of a vertical type.

Figure 6B:
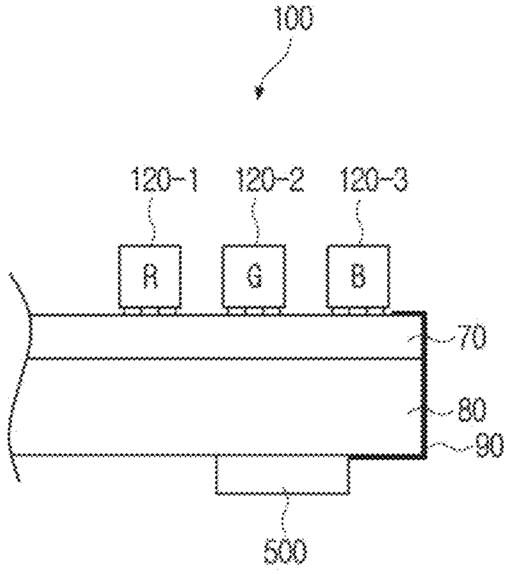
FIG. 6B is a cross-sectional view of a display panel according to an embodiment.

FIG. 6B is a cross-sectional view of the display panel 100 according to an embodiment.

Referring to FIG. 6B, the display panel 100 may include the TFT layer 70 formed on one side of the glass substrate 80, the inorganic light-emitting elements R, G, B (120-1, 120-2, 120-3) mounted on the TFT layer 70, the driver 500, and connection wiring 90 for electrically connecting the driver 500 with the sub-pixel circuit 110 formed on the TFT layer 70.

As described above, according to an embodiment, at least some of the various components described above that can be included in the driver 500 may be disposed on the back side of the glass substrate 80 and connected to the sub-pixel circuits 110 formed in the TFT layer 70 through the connection wiring 90.

Referring to FIG. 6B, it can be seen that the sub-pixel circuits 110 included in the TFT layer 70 are electrically connected to the driver 500 (specifically, at least some of the various components described above) through the connection wiring 90 formed on the edge (or side) of the TFT panel (hereinafter, both the TFT layer 70 and the glass substrate 80 as a combination are referred to as the TFT panel).

As such, the reason for connecting the sub-pixel circuits 110 and the driver 500 through the connection wiring 90 formed on the edge region of the display panel 100 is that when connecting the sub-pixel circuits 110 and the driver 500 by forming a hole penetrating the glass substrate 80, problems such as cracks forming in the glass substrate 80 may occur due to a temperature difference between the manufacturing process of the TFT panels 70, 80 and the process of filling the hole with a conductive material.

Figure 6C:
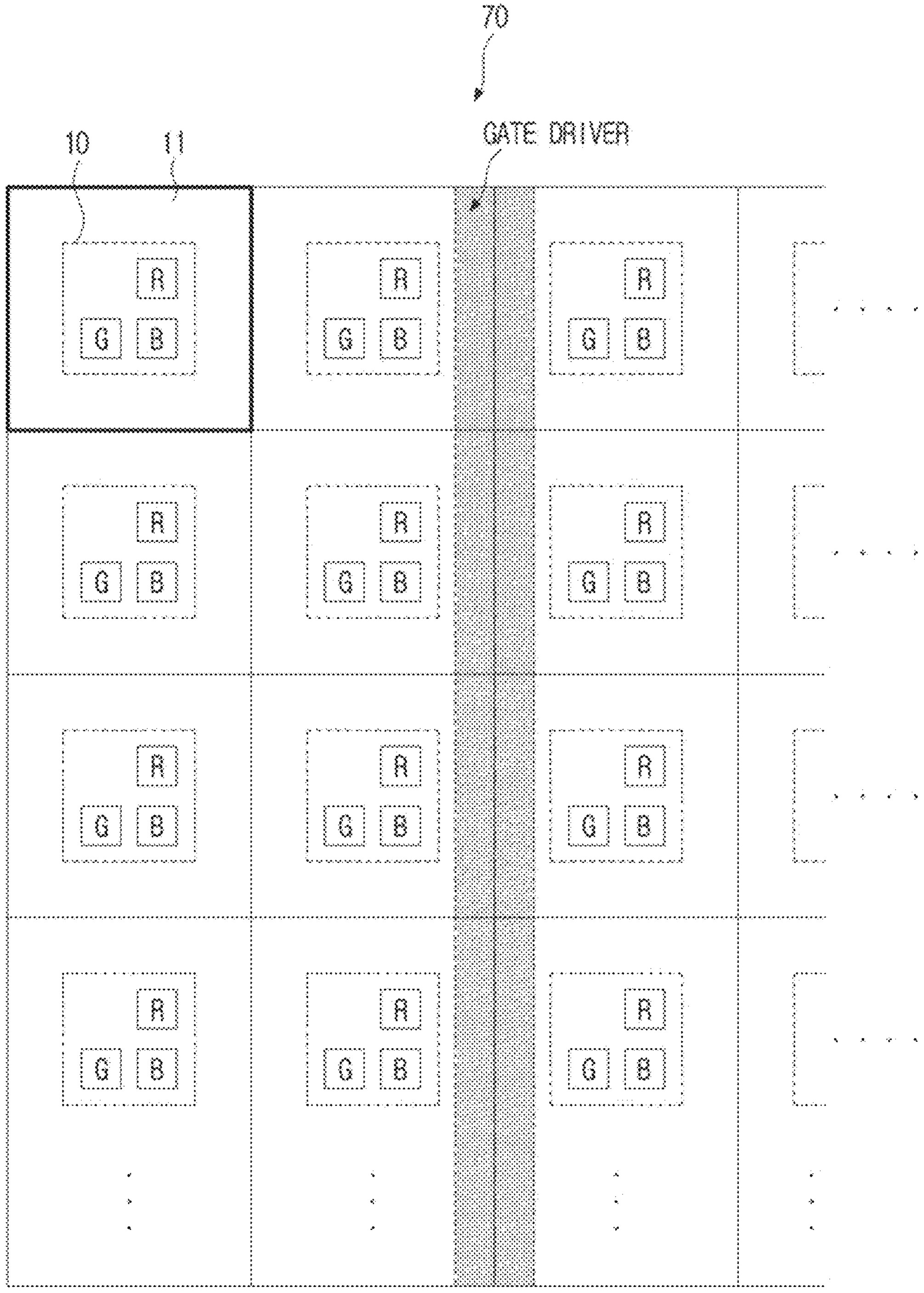
FIG. 6C is a plan view of a TFT layer according to an embodiment.

Meanwhile, as described above, according to another embodiment of the present disclosure, at least some of the various components that can be included in the driver 500 may be formed in the TFT layer along with the sub-pixel circuits and connected to the sub-pixel circuits. FIG. 6C illustrates such an embodiment.

FIG. 6C is a plan view of the TFT layer 70 according to an embodiment. Referring to FIG. 6C, in the TFT layer 70, in addition to the region occupied by one pixel 10 (in this region, there are the sub-pixel circuits 110 corresponding to each of the R, G, and B sub-pixels included in the pixel 10), there are remaining regions 11, and some of the various components that can be included in the driver (500) described above may be formed in this remaining regions 11.

FIG. 6C illustrates an example in which the above-described gate driver is implemented in the remaining regions 11 of the TFT layer 70. As such, the structure in which the gate driver is formed inside the TFT layer 70 may be referred to as a Gate In Panel (GIP) structure, but is not limited to this designation. In addition, the location of the gate driver formed in the TFT layer 70 is not limited to that shown in FIG. 6C, either.

Meanwhile, FIG. 6C is only an example, and the components that can be included in the remaining regions 11 of the TFT layer 70 are not limited to the gate driver. Depending on the embodiment, the TFT layer 70 may further include a De-MUX circuit for selecting each of the R, G, and B sub-pixels, an electro static discharge (ESD) protection circuit for protecting the sub-pixel circuits 110 from static electricity, and the like.

In the above, an example where the substrate on which the TFT layer 70 is formed is the glass substrate 80 has been described, but embodiments are not limited thereto. In some cases, the TFT layer 70 may be formed on a synthetic resin substrate. In this case, the sub-pixel circuits 110 of the TFT layer 70 and the driver 500 may be connected through a hole penetrating through the synthetic resin substrate.

Meanwhile, in the above, an example in which the sub-pixel circuit 110 is implemented on the TFT layer 70 has been described. However, the embodiment is not limited thereto. In other words, according to another embodiment of the present disclosure, it is possible to implement a pixel circuit chip in the form of an ultra-small micro-IC in units of a sub-pixel or a pixel and mount the same on a substrate without using the TFT layer 70. In this case, the location where the sub-pixel circuit chip is mounted may be, for example, in the vicinity of the corresponding inorganic light-emitting element 120, but is not limited thereto.

In addition, in the above, an example in which the gate driver is formed in the TFT layer 70 has been described, but the embodiment is not limited thereto. In other words, according to another embodiment of the present disclosure, the gate driver may be implemented as a gate driver chip in the form of an ultra-small micro IC and mounted on the TFT layer 70.

Further, in the various embodiments of the present disclosure described above, the TFTs constituting the TFT layer (or TFT panel) are not limited to a particular structure or type. In other words, the TFTs cited in the various examples of the present disclosure may be implemented as low temperature poly silicon (LTPS) TFTs, oxide TFTs, silicon (poly silicon or a-silicon) TFTs, organic TFTs, graphene TFTs, etc., and it is also possible to make and apply only a P type (or N-type) MOSFET in a Si wafer CMOS process.

Figure 7:
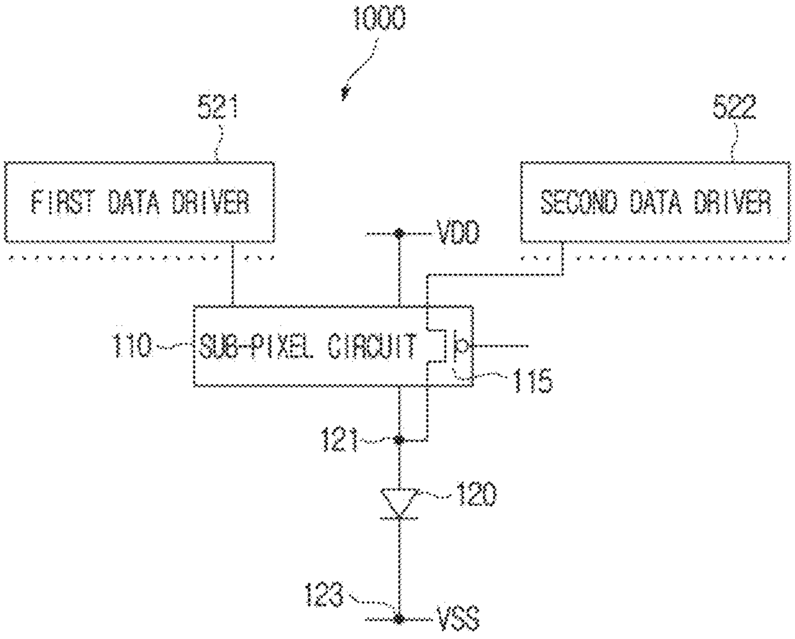
FIG. 7 is a view provided to explain an operation of a sub-pixel circuit according to an embodiment.

FIG. 7 is a view provided to explain an operation of the sub-pixel circuit 110 according to an embodiment.

According to an embodiment, during the data setting section, an image data voltage may be set in the sub-pixel circuit 110, and a reset voltage may be set in the anode terminal 121 of the inorganic light-emitting element 120.

In this case, the image data voltage and the reset voltage may be applied to the sub-pixel circuit 110 through separate lines from separate data drivers. In FIG. 7, a first data driver 521 represents a data driver that provides the image data voltage, and a second data driver 522 represents a data driver that provides the reset voltage.

Specifically, referring to FIG. 7, when the sub-pixel circuit 110 is selected in response to a scan signal during the data setting section, the image data voltage provided from the first data driver 521 may be set in the sub-pixel circuit 110.

Meanwhile, the sub-pixel circuit 110 includes a reset transistor 115. The reset transistor 115 is configured to apply the reset voltage provided from the second data driver 522 to the anode terminal 121 of the inorganic light-emitting element 120 while turned on.

FIG. 7 illustrates a case where the reset transistor is a PMOSFET. Referring to FIG. 7, the source terminal of the reset transistor 115 is connected to the second data driver 522, and the drain terminal is connected to the anode terminal 121 of the inorganic light-emitting element 120. Accordingly, when the reset transistor 115 is turned on in response to a signal applied to the gate terminal of the reset transistor 115, the reset voltage provided from the second data driver 522 may be applied to the anode terminal 121 of the inorganic light-emitting element 120 through the reset transistor 115.

In this case, according to an embodiment, a scan signal identical to the scan signal for setting the image data voltage in the sub-pixel circuit 110 may be applied to the gate terminal of the reset transistor 115. In this case, the image data voltage and the reset voltage may be simultaneously set in the sub-pixel circuit 110 and the anode terminal 121, respectively. As described above, the image data voltage and the reset voltage are set through separate data drivers and separate lines, so there is no problem in setting even if the same scan signal is used.

According to an embodiment, during the data setting section, a separate scan signal (e.g., a second scan signal) that is different from the scan signal (e.g., the first scan signal) for setting the image data voltage may be applied to the gate terminal of the reset transistor 115. In this case, the image data voltage may be set by the first scan signal, and the reset voltage may be set by the second scan signal, respectively.

Meanwhile, the reset voltage applied to the anode terminal 121 of the inorganic light-emitting element 120 may be maintained until a light-emitting section starts by a parasitic capacitance formed between the anode terminal 121 and the cathode terminal 123 of the inorganic light-emitting element 120. Since the actual inorganic light-emitting element 120 is mounted on an electrode pad on the TFT layer 70 and connected to the sub-pixel circuit 110, there is a parasitic capacitance component formed by the electrode pad and the TFTs included in the TFT layer 70 between the anode terminal 121 and the cathode terminal 123 of the inorganic light-emitting element 120, and the reset voltage can remain applied due to such parasitic capacitance.

Since the voltage of the anode terminal 121 of the inorganic light-emitting element 120 rises from the set reset voltage in the subsequent light-emitting section, the problem caused by the deviations described above can be solved as described above.

Figure 8:
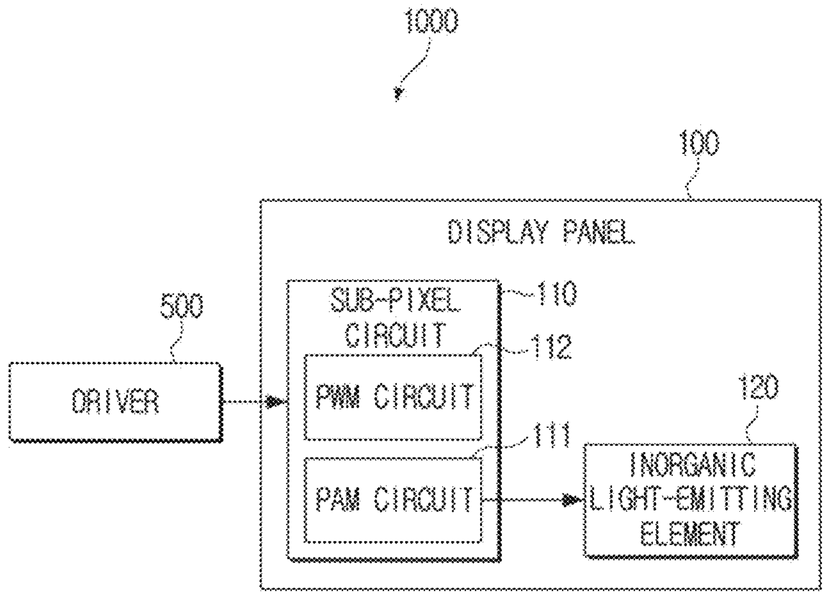
FIG. 8 is a block diagram illustrating configuration of a device according to an embodiment.

FIG. 8 is a detailed block diagram illustrating configuration of the device 1000 according to an embodiment. In describing FIG. 8, any description that is redundant to the foregoing will be omitted.

Referring to FIG. 8, the display device 1000 includes the display panel 100 including the sub-pixel circuit 110 and the inorganic light-emitting elements 120, and the drive unit 500. For convenience of explanation, FIG. 8 illustrates only configuration regarding one sub-pixel included in the display panel 100, but the sub-pixel circuit 110 and the inorganic light-emitting element 120 may be provided for each sub-pixel of the pixel array included in the display panel 100.

The inorganic light-emitting element 120 may be mounted on the sub-pixel circuit 110 so as to be electrically connected to the sub-pixel circuit 110, and may emit light based on driving current provided by the sub-pixel circuit 110.

The inorganic light-emitting element 120 constitutes sub-pixels of the display panel 100, and may be of a plurality of types depending on the color of the light emitted. For example, the inorganic light-emitting element 120 may be one of a red (R) inorganic light-emitting element that emits red light, a green (G) inorganic light-emitting element that emits green light, and a blue (B) inorganic light-emitting element that emits blue light.

The type of sub-pixel may be determined by the type of inorganic light-emitting element 120. In other words, the R inorganic light-emitting element may constitute R sub-pixel 20-1, the G inorganic light-emitting element may constitute G sub-pixel 20-2, and the B inorganic light-emitting element may constitute B sub-pixel 20-3.

Here, the inorganic light-emitting element 120 refers to a light-emitting element manufactured using inorganic materials, which is different from an organic light-emitting diode (OLED) manufactured using organic materials.

In particular, according to an embodiment, the inorganic light-emitting element 120 may be a micro light-emitting diode (micro LED or μLED) having a magnitude of 100 micrometers (μm) or less.

A display panel in which each sub-pixel is implemented as a micro LED is referred to as a micro LED display panel. The micro LED display panel is a type of flat panel display panel that consists of a plurality of inorganic light-emitting diodes (inorganic LEDs), each of which is 100 micrometers or less. The micro LED display panel offers better contrast, response time, and energy efficiency compared to a liquid crystal display (LCD) panel that requires backlighting. Meanwhile, while both organic light-emitting diodes (OLEDs) and micro LEDs are energy efficient, micro LEDs offer better performance than OLEDs in terms of brightness, luminous efficiency, and lifespan.

As such, when very small micro LEDs are used, the magnitude of the remaining regions 11 described above in FIG. 6C becomes relatively large, allowing a sufficient space for additional wiring to be placed on the display panel 100 (e.g., wiring to which the reset voltage is applied from the second data driver 522).

The inorganic light-emitting element 120 may express various grayscales depending on the magnitude and/or pulse width of the driving current provided from the sub-pixel circuit 110. Here, the pulse width of the driving current may also be referred to as a duty ratio or a duration of the driving current.

For example, the inorganic light-emitting element 120 may express brighter grayscale values as the magnitude of the driving current increases. In addition, the inorganic light-emitting element 120 may express brighter grayscale values as the pulse width of the driving current increases (i.e., as the duty ratio or the driving time increases).

The sub-pixel circuit 110 provides driving current to the inorganic light-emitting element 120.

Specifically, the sub-pixel circuit 110 may provide driving current of which magnitude and/or driving time is controlled to the inorganic light-emitting element 120 based on an image data voltage (e.g., PAM data voltage, PWM data voltage), a reset voltage, a driving voltage (e.g., first driving voltage, second driving voltage, ground voltage), and various control signals (e.g., scan signal, emission signal) applied from the driver 500.

A sub-pixel circuit 111 includes the reset transistor 115. As described above, a reset voltage may be set in the anode terminal 121 of the inorganic light-emitting element 120 through the reset transistor 115.

The sub-pixel circuit 110 may drive the inorganic light-emitting element 120 through pulse amplified modulation (PAM) and/or pulse width modulation (PWM).

To this end, the sub-pixel circuit 110 may include a PAM circuit 111 for providing driving current of a size based on the PAM data voltage to the inorganic light-emitting element 120, and/or a PWM circuit 112 for controlling the time at which the driving current is provided to the inorganic light-emitting element 120 based on the PWM data voltage.

Hereinafter, as illustrated in FIG. 8, a case in which the sub-pixel circuit 110 includes both the PAM circuit 111 and the PWM circuit 112 is described as an example. However, the present disclosure is not limited thereto, and the sub-pixel circuit 111 may include only the PAM circuit 111 or only the PWM circuit 112, depending on the embodiment.

Meanwhile, according to an embodiment, the same PAM data voltage may be applied to all PAM circuits 111 of the display panel 100, and the grayscale of the image may be expressed by the PWM data voltage applied to the PWM circuit 112.

Since the inorganic light-emitting element 120 has the characteristics that not only the luminance but also the wavelength changes depending on the change in the magnitude of the driving current, the decrease in color reproducibility due to the characteristics of the inorganic light-emitting element 120 can be prevented by keeping the magnitude of the driving current the same and expressing the grayscale of the image using the PWM driving method.

In this case, since a DC voltage of a constant magnitude may be used as the PAM data voltage, the PAM data voltage may be provided from a power IC, unlike the PWM data voltage, which is applied from a data driver. Meanwhile, according to an embodiment, the same PAM data voltage may be applied to the PAM circuits 111 of the display panel 100 for each type of sub-pixel. In other words, since the characteristics may differ depending on the type of the inorganic light-emitting element 120, different magnitudes of PAM data voltages may be applied to different types of sub-pixel circuits. Even in this case, the same PAM data voltage may be applied to the same type of sub-pixel circuits.

In the above example, each PWM circuit 112 of the display panel 100 may be applied with a PWM data voltage corresponding to the grayscale value of each sub-pixel. Accordingly, even though the magnitude of the driving current is the same, the grayscale of the image may be expressed by controlling the driving time of the driving current (i.e., constant current) provided to the inorganic light-emitting element 120 of each sub-pixel through the PWM circuit 112.

Meanwhile, in the case of a modular display panel, a separate PAM data voltage may be applied to each display module. As a result, brightness deviations or color deviations between display modules can be compensated for by adjusting the PAM data voltage.

Hereinafter, specific operations of a sub-pixel circuit according to an embodiment will be described in detail with reference to FIGS. 9A to 9C.

Figure 9A:
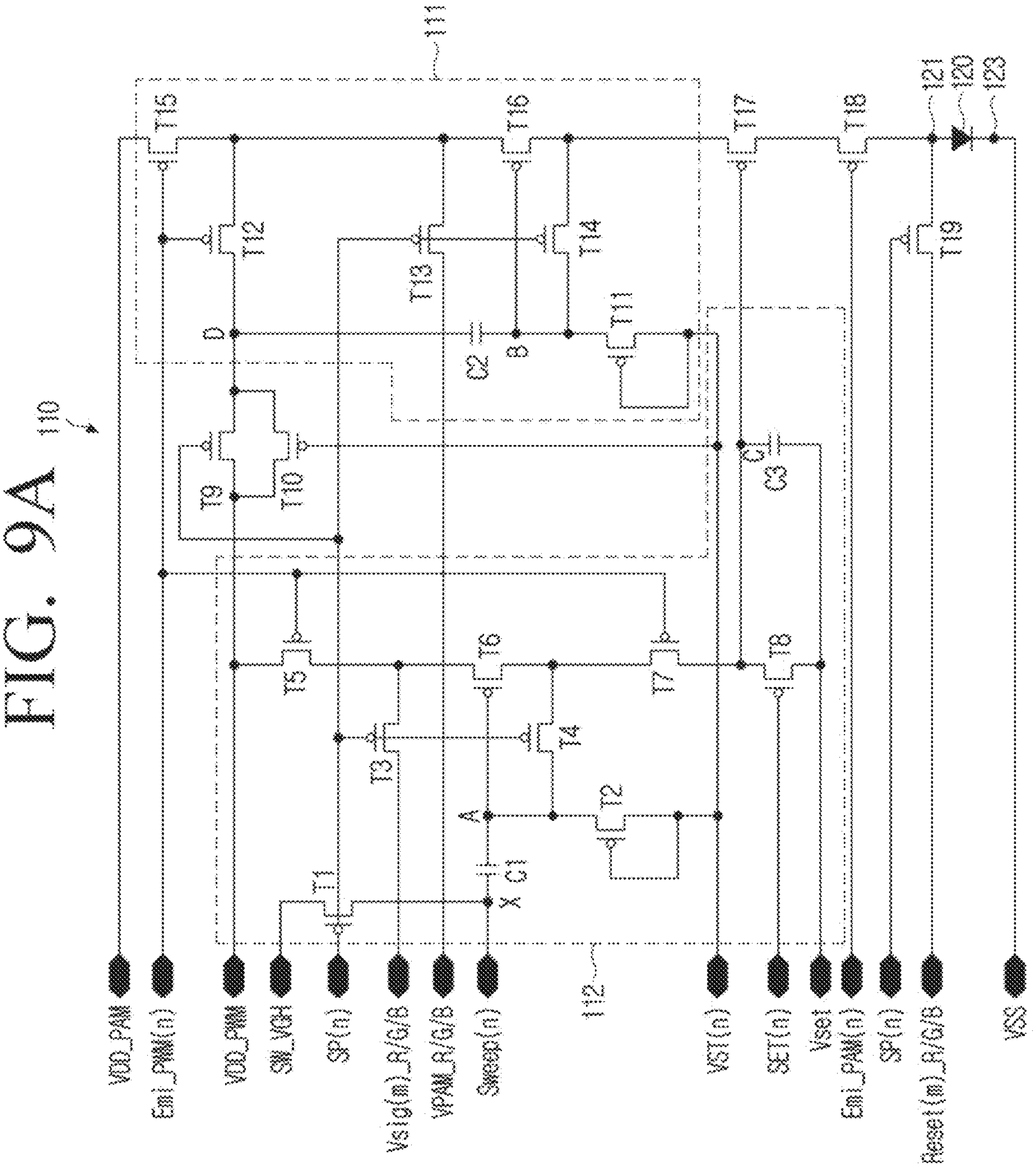
FIG. 9A is a detailed circuit view of a sub-pixel circuit according to an embodiment.

FIG. 9A is a detailed circuit view of the sub-pixel circuit 110 according to an embodiment. Referring to FIG. 9A, the sub-pixel circuit 110 includes the PAM circuit 111, the PWM circuit 112, a first switching transistor T17, a second switching transistor T18, a transistor T9, a transistor T10, and a reset transistor T19.

The transistor T9 and the transistor T10 are circuit configurations for applying a second driving voltage (VDD_PWM) to the PAM circuit 111 during the data setting section.

The reset transistor T19 has a drain terminal connected to the anode terminal of the inorganic light-emitting element 120 and a source terminal connected to a reset voltage (Reset(m)_R/G/B) signal line applied from the second data driver 522.

Meanwhile, FIG. 9A illustrates a case in which a scan signal SP(n) is used as a control signal applied to the gate terminal of the reset transistor T19. Therefore, when the image data voltage applied from the first data driver 521 is applied to the sub-pixel circuit 110 according to the scan signal SP(n), the reset voltage applied from the second data driver 522 is also applied to the anode terminal 121 of the inorganic light-emitting element 120.

However, the embodiment is not limited thereto. In other words, according to an embodiment, a scan signal VST(n) may be applied to the gate terminal of the reset transistor T19. In this case, when the voltages of node A and node B are initialized according to the scan signal VST(n), the reset voltage applied from the second data driver 522 is also applied to the anode terminal 121 of the inorganic light-emitting element 120.

In addition, according to an embodiment, a separate scan signal different from VST(n) or SP(n) may be used to turn on the reset transistor T19. In this case, the separate scan signal is applied to the gate terminal of the reset transistor T19, and while the reset transistor T19 is turned on by the corresponding scan signal, the reset voltage applied from the second data driver 522 may also be applied to the anode terminal 121 of the inorganic light-emitting element 120. Meanwhile, when the driving current starts to flow, the voltage of the anode terminal 121 of the inorganic light-emitting element 120 must rise from the reset voltage so that the deviations described above can be compensated, so even in this case, the reset voltage must be set in the anode terminal 121 of the inorganic light-emitting element 120 before the light-emitting section starts.

Meanwhile, in FIG. 9A, VDD_PAM represents a first driving voltage (e.g., +10 [V]), VDD_PWM represents a second driving voltage (e.g., +10 [V]), VSS represents a ground voltage (e.g., 0 [V]), and Vset represents a low voltage (e.g., −3 [V]) for turning on the first switching transistor T17. The VDD_PAM, VDD_PWM, VSS, and Vset may be provided by, but are not limited to, any of the power ICs described above.

VST(n) represents a scan signal applied to the sub-pixel circuit 110 to initialize the voltages of node A (gate terminal of the second drive transistor T6) and node B (gate terminal of the first drive transistor T16).

SP(n) represents a scan signal that is applied to set (or program) the image data voltage (i.e., PWM data voltage, PAM data voltage) in the sub-pixel circuit 110.

SET(n) represents an emission signal applied to the PWM circuit 112 to turn on the first switching transistor T17.

Emi_PWM(n) represents an emission signal to turn on transistor T5 to apply the second driving voltage (VDD_PWM) to the PWM circuit 112, and to turn on transistor T15 and transistor T12 to apply the first driving voltage (VDD_PAM) to the PAM circuit 111.

Sweep(n) represents a sweep signal. According to an embodiment, the sweep signal may be, but is not limited to, a voltage signal that linearly changes between two different voltages. In this embodiment, the sweep signal may be applied repeatedly in the same form for each light-emitting section.

Emi_PAM(n) represents an emission signal to turn on the second switching transistor T18.

In the above signals, n represents the nth row line. As described above, the driver 500 drives the display panel 110 for each row line (or scan line or gate line), and the control signals described above (VST(n), SP(n), SET(n), Emi_PWM(n), Sweep(n), and Emi_PAM(n)) may be applied to all sub-pixel circuits 110 included in the nth row line in the same order as illustrated in FIG. 9B, which will be described later.

The control signals described above (scan signal, emission signal, sweep signal) may be applied from the gate driver and may be referred to as gate signals.

Vsig(m)_R/G/B represents a PWM data voltage signal for each of the R, G, and B sub-pixels of the pixel included in the mth column line. Since the gate signals described above are for the nth row line, Vsig(m)_R/G/B represents the PWM data voltage signals (specifically, the PWM data voltages for each of the time-division multiplexed R, G, and B sub-pixels) applied to the pixel located at the intersection of the nth row line and the mth column line.

The PWM data voltage may be applied from the first data driver 521. In addition, the PWM data voltage may have a voltage value higher than the second driving voltage (VDD_PWM), except for the voltage corresponding to the black grayscale. For example, a voltage between +10 [V] (full black) and +15 [V] (full white) may be used as the PWM data voltage, but the present disclosure is not limited thereto.

Meanwhile, since the sub-pixel circuit 110 shown in FIG. 9A illustrates the sub-pixel circuit 110 corresponding to any one of the R, G, and B sub-pixels (e.g., the R sub-pixel), only the PWM data voltage for the R sub-pixel among the time-division multiplexed PWM data voltages is selected and applied through a demux circuit.

Reset(m)_R/G/B represents a reset voltage signal for each of the R, G, and B sub-pixels of the pixel included in the mth column line. Reset(m)_R/G/B represents reset voltage signals applied to the pixel located at the intersection of the nth row line and the mth column line (specifically, the reset voltages for each of the time-division multiplexed R, G, and B sub-pixels).

The reset voltage may be applied from the second data driver 522. In addition, since the inorganic light-emitting element 120 should not emit light while the reset voltage is set before the light-emitting section is initiated, the reset voltage may be voltages in a voltage range lower than the sum VSS+Vf of the ground voltage VSS and the forward voltage Vf of the inorganic light-emitting element. For example, the reset voltage may be a voltage lower than the ground voltage VSS, but is not limited thereto.

Meanwhile, since the sub-pixel circuit 110 shown in FIG. 9A illustrates the sub-pixel circuit 110 corresponding to any one of the R, G, and B sub-pixels (e.g., the R sub-pixel), only the reset voltage for the R inorganic light-emitting element 120 among the time-division multiplexed PWM data voltages may be selected and applied through the demux circuit.

VPAM_R/G/B represents a PAM data voltage signal for each of the R, G, and B sub-pixels included in the display panel 100. As described above, according to an embodiment, same PAM data voltage may be applied to the display panel 100.

However, the fact that the PAM data voltage is the same means that the same PAM data voltage is applied to the same type of sub-pixels included in the display panel 100, and does not necessarily mean that the same PAM data voltage must be applied to all different types of sub-pixels, such as R, G, and B.

As mentioned above, the R, G, and B sub-pixels may have different characteristics depending on the type of sub-pixel, so the PAM data voltage may differ depending on the type of sub-pixel. Even in this case, the same PAM data voltage can be applied to the same type of sub-pixel regardless of a column line or a row line.

Meanwhile, according to an embodiment, the PAM data voltage may not be applied from the first data driver 522 like the PWM data voltage, but may be applied directly from the power IC for each type of sub-pixel. In other words, since the same PAM data voltage can be applied to the same type of sub-pixel regardless of a column line or a row line, a DC voltage may be used as the PAM data voltage. Accordingly, three types of DC voltages (e.g., +5.1 [V], +4.8 [V], +5.0 [V]) corresponding to each of the R, G, and B sub-pixels may be individually and directly applied from the power IC to each of the R, G, and B sub-pixel circuits of the display panel 100. In this case, a separate data driver for applying the PAM data voltage to the sub-pixel circuit 110 is not required.

Meanwhile, depending on the embodiment, if using the same PAM data voltage for different types of sub-pixels exhibits better characteristics, the same PAM data voltage may be applied to different types of sub-pixels.

Figure 9B:
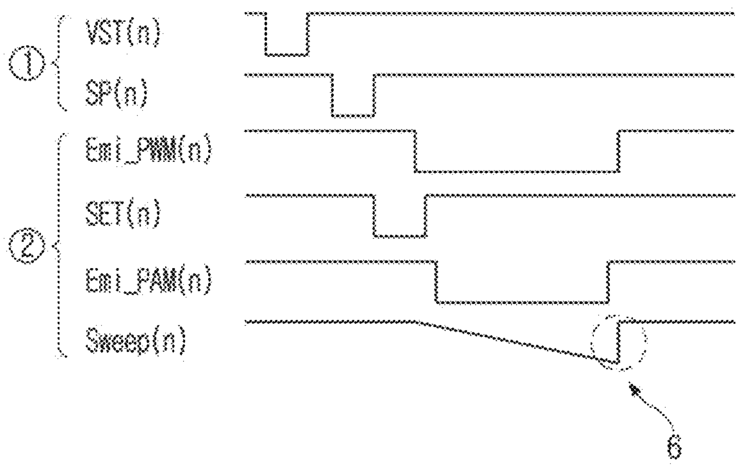
FIG. 9B is a timing view for gate signals described above in FIG. 9A.

FIG. 9B is a timing view for gate signals described above in FIG. 9A.

Among the gate signals shown in FIG. 9B, VST(n) and SP(n) (①) are scan signals associated with the data setting operation of the sub-pixel circuit 110. In addition, among the gate signals shown in FIG. 9B, Emi_PWM(n), SET(n), Emi_PAM(n), and Sweep(n) (②) are emission signals associated with the light-emitting operation of the sub-pixel circuit 110.

According to an embodiment, as shown in FIG. 2C, for one image frame, the data setting section may be performed once, and the light-emitting section may be performed multiple times. To this end, the driver 500 may apply the scan signals ① to each row line of the display panel 100 once, and the emission signals ② to each row line of the display panel 100 multiple times, for one image frame.

Figure 9C:
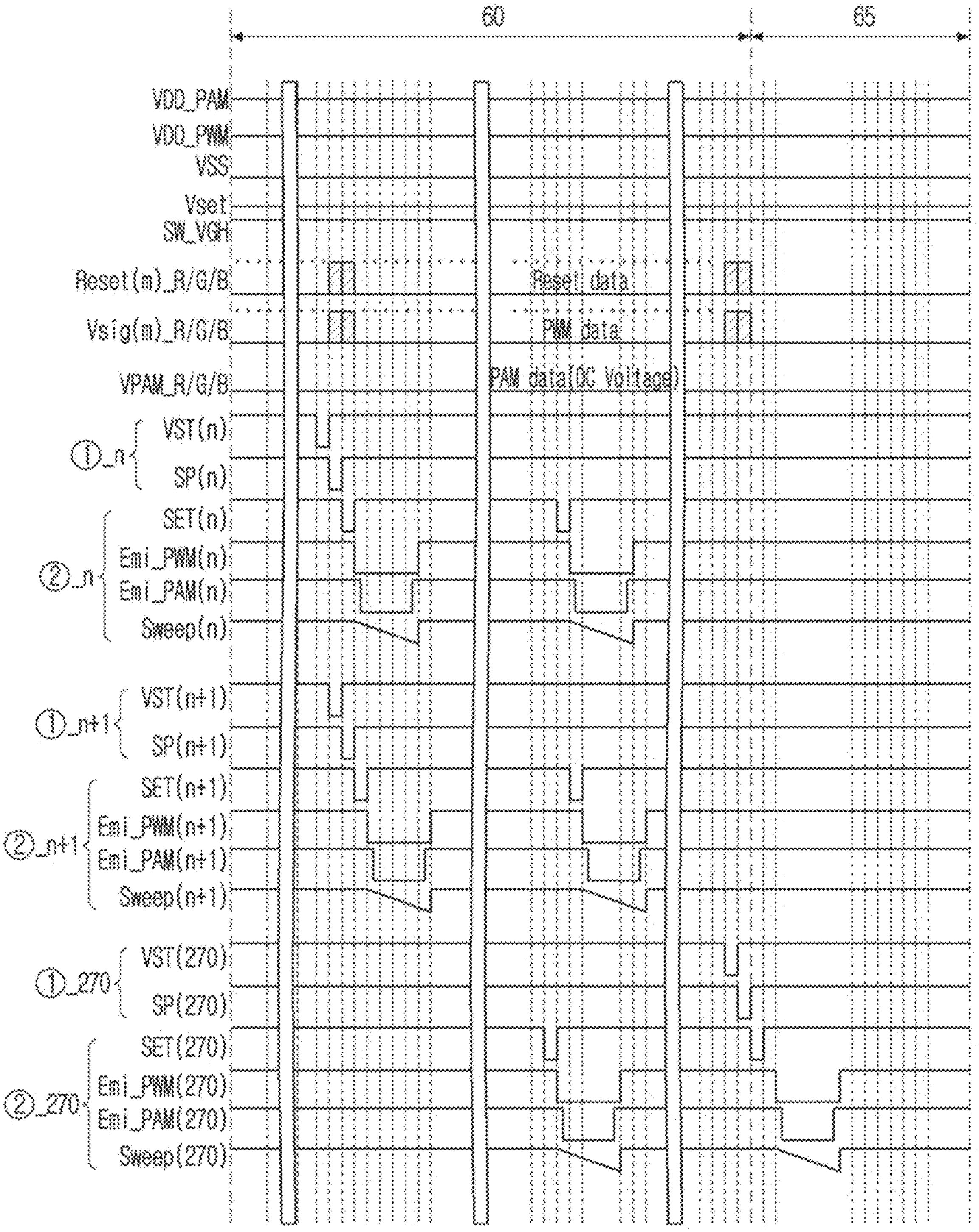
FIG. 9C is a driving timing view of a display panel according to an embodiment.

FIG. 9C is a driving timing view for driving the display panel 100 that includes the sub-pixel circuit 110 of FIG. 9A according to an embodiment. In FIG. 9C, a case where the display panel 100 includes 270 row lines is described as an example. In FIG. 9C, reference numeral 60 represents an image frame period, and reference numeral 65 represents a blanking period.

As shown in reference numerals ①_n, ①_n+1 to ①_270, the scan signals (VST(n), SP(n)) for the data setting operation may be applied once to each row line in row line order during the image frame period 60.

In addition, as shown in reference numerals ②_n, ②_n+1 to ②_270, the emission signals (Emi_PWM(n), SET(n), Emi_PAM(n), and Sweep(n)) for the light-emitting operation may be applied multiple times to each row line in row line order.

Hereinafter, specific operations of the sub-pixel circuit 110 will be described with reference to FIGS. 9A and 9C together.

When the data setting section starts in each row line, the driver 500 first turns on the first drive transistor T16 included in the PAM circuit 111 and the second drive transistor T6 included in the PWM circuit 112. To this end, the driver 500 applies a low voltage (e.g., −3 [V]) to the sub-pixel circuit 110 through the VST(n) signal.

Referring to FIG. 9A, when a low voltage is applied to the gate terminal (hereinafter, referred to as node A) of the second drive transistor T6 through the transistor T2 turned on according to the VST(n) signal, the second drive transistor T6 is turned on. In addition, when a low voltage is applied to the gate terminal (hereinafter, referred to as node B) of the first drive transistor T16 through the transistor T11 turned on according to the VST(n) signal, the first drive transistor T16 is turned on.

Meanwhile, when a low voltage (e.g., −3 [V]) is applied to the sub-pixel circuit 110 through the VST(n) signal, the transistor T10 is also turned on, and the VDD_PWM (hereinafter, referred to as the second driving voltage (e.g., +10 [V])) voltage is applied to node D through the turned-on transistor T10. In this case, the second driving voltage becomes a reference potential for setting the PAM data voltage, which is to be performed according to the SP(n) signal thereafter.

In the data setting section, when the first drive transistor T16 and the second drive transistor T6 are turned on through the VST(n) signal, the driver 500 inputs the image data voltage to each of node A and node B, and inputs the reset voltage to the anode terminal 121 of the inorganic light-emitting element 120. To this end, the driver 500 applies a low voltage to the sub-pixel circuit 110 through the SP(n) signal.

When a low voltage is applied to the sub-pixel circuit 110 through the SP(n) signal, transistor T3 and transistor T4 of the PWM circuit 112 are turned on. Accordingly, the PWM data voltage from the data signal line (Vsig(m)_R/G/B) may be applied to node A through the turned-on transistor T3, the turned-on second drive transistor T6, and the turned-on transistor T4. In this case, the PWM data voltage applied from the driver 500 (specifically, the first data driver 521) is not set as it is in node A, but the PWM data voltage where the threshold voltage of the second drive transistor T6 is compensated for (i.e., a voltage that is the sum of the PWM data voltage and the threshold voltage of the second drive transistor T6) is set. This is because the second drive transistor T6 is turned off when the voltage difference between the gate terminal and the source terminal of the second drive transistor T6 reaches the threshold voltage of the second drive transistor T6.

In addition, when a low voltage is applied to the sub-pixel circuit 110 through the SP(n) signal line, the transistor T13 and transistor T14 of the PAM circuit 111 are also turned on. Accordingly, through the turned-on transistor T13, the turned-on first drive transistor T16, and the turned-on transistor T14, the PAM data voltage from the data signal line VPAM_R/G/B may be applied to node B. In this case, the PWM data voltage applied from the driver 500 (specifically, the power IC) is not set as it is in node B, but for the same reason described above for node A, the PWM data voltage where the threshold voltage of the first drive transistor T16 is compensated for (i.e., a voltage that is the sum of the PWM data voltage and the threshold voltage of the first drive transistor T16) is set.

Further, when a low voltage is applied to the sub-pixel circuit 110 through the SP(n) signal, the reset transistor T19 is turned on. Accordingly, the reset voltage may be applied from the reset voltage signal line (Reset(m)_R/G/B) to the anode terminal 121 of the inorganic light-emitting element 120 through the turned-on reset transistor T19. In this case, the applied reset voltage may be maintained by a parasitic capacitance component formed between the anode terminal 121 and the cathode terminal 123 of the inorganic light-emitting element 120, as described above.

Meanwhile, when a low voltage is applied to the sub-pixel circuit 110 through the SP(n) signal line, the transistor T9 is also turned on, and since the second driving voltage (VDD_PWM) is applied to node D through the turned-on transistor T9, the reference potential for the PAM data voltage set in node B (specifically, the PAM data voltage where the threshold voltage of the first drive transistor T16 is compensated for) remains unchanged.

Once the setting of each data voltage in the PAM circuit 111 and the PWM circuit 112 is completed, the driver first turns on the first switching transistor T17 to cause the inorganic light-emitting element 120 to emit light. To this end, the driver 500 applies a low voltage to the transistor T8 through the SET(n) signal When a low voltage is applied to the transistor T8 along the SET(n) signal line, a Vset voltage is charged to capacitor C3 through the turned-on transistor T8. Since Vset is a low voltage (e.g., −3 [V]), when the Vset voltage is charged to the capacitor C3, a low voltage is applied to the gate terminal (hereinafter, referred to as node C) of the first switching transistor T17, and the first switching transistor T17 is turned on.

Meanwhile, depending on the embodiment, the low voltage applied through the SET(n) signal line may be applied earlier than the time in point shown in FIG. 9B or FIG. 9C.

When the first switching transistor T17 is turned on, the driver 500 causes the inorganic light-emitting element 120 to emit light based on the voltages set in node A and node B. To this end, the driver 500 applies a low voltage to the sub-pixel circuit 110 through the Emi_PWM(n) and Emi_PAM(n) signal lines, and applies a sweep voltage to the sub-pixel circuit 110 through the Sweep(n) signal line.

First, the operation of the PAM circuit 111 according to the signals applied from the driver 500 in the light-emitting section is described as follows. In this case, it is assumed that the PWM data voltage corresponding to the black grayscale is not set in the PWM circuit 112.

The PAM circuit 111 may provide constant current to the inorganic light-emitting element 120 based on the voltage set in node B.

Specifically, during the light-emitting section, a low voltage is applied to the gate terminals through the Emi_PWM (n) and Emi_PAM(n) signal lines, so the transistor T15 and the second switching transistor T18 are turned on.

Meanwhile, the first switching transistor T17 is in a turned-on state according to the SET(n) signal as described above.

In addition, as described above, when a voltage that is the sum of the PAM data voltage (e.g., +5 [V]) and the threshold voltage of the first driving transistor T16 is applied to node B, if VDD_PAM (hereinafter, referred to as the first driving voltage (e.g., +10 [V])) is applied to the source terminal of the first driving transistor T16 through the transistor T15 that is turned on according to the Emi_PWM(n) signal, the first driving transistor T16 is also turned on.

Accordingly, the first driving voltage (VDD_PAM) is applied to the anode terminal 121 of the inorganic light-emitting element 120 through the turned-on transistor T15, the first drive transistor T16, the first switching transistor T17, and the second switching transistor T18, and a potential difference exceeding the forward voltage Vf is generated at the two ends 121, 123 of the inorganic light-emitting element 120. Accordingly, driving current (i.e., constant current) flows through the inorganic light-emitting element 120, and the inorganic light-emitting element 120 begins to emit light. In this case, the magnitude of the driving current (i.e., constant current) that causes the inorganic light-emitting element 120 to emit light has a magnitude corresponding to the PAM data voltage.

Meanwhile, when the first driving voltage (VDD_PAM) is applied to the anode terminal 121 of the inorganic light-emitting element 120, the voltage of the anode terminal 121 of the inorganic light-emitting element 120 starts to rise from the reset voltage set in the data setting section. Accordingly, as described above, the problem of degradation of low-grayscale luminance uniformity due to a deviation in the electrical characteristics of the inorganic light-emitting element 120 or a deviation in the ground voltage VSS can be solved.

Meanwhile, in the light-emitting section, the driving voltage applied to the PAM circuit 111 is changed from the second driving voltage (VDD_PWM) to the first driving voltage (VDD_PAM). Referring to FIG. 9A, it can be seen that when a low voltage is applied to the transistor T12 and the transistor T15 according to the Emi_PWM(n) signal, the first driving voltage (VDD_PAM) is applied to node D through the turned-on transistor T12 and the transistor T15.

When the driving current flows to the inorganic light-emitting element 120, an IR drop occurs, which may result in a voltage drop of the first driving voltage. However, even if a voltage drop occurs in the first driving voltage, the voltage between the gate terminal and the source terminal of the first drive transistor T16 remains the same as the voltage set in the data setting section regardless of the amount of voltage drop in the first driving voltage (i.e., the amount of IR drop). This is because even if the voltage applied to node D is changed to any voltage, the voltage of node B is also changed by coupling through the capacitor C2 as much as the amount of change.

Therefore, according to an embodiment, in the data setting section, the second driving voltage without a voltage drop is applied to the PAM circuit 111, so that an accurate PAM data voltage can be set in the PAM circuit 111 regardless of the voltage drop of the first driving voltage. In addition, in the light-emitting section, the driving voltage is changed to the first driving voltage, which may have a voltage drop, but as described above, the voltage between the gate terminal and the source terminal of the first drive transistor T16 is kept the same as the voltage set in the data setting section, so that the PAM circuit 111 can operate normally regardless of the voltage drop of the first driving voltage. In particular, when the display panel 100 is driven so that not only the data setting section but also the light-emitting section proceeds in the order of row lines, as shown in FIG. 2B or FIG. 2C, since some row lines of the display panel 100 operate in the light-emitting section while other row lines operate in the data setting section, the above-described feature may be of great significance.

Next, the operation of the PWM circuit 112 according to the signals applied from the driver 500 during the light-emitting section is described as follows.

The PWM circuit 112 may control the light emission time of the inorganic light-emitting element 120 based on the voltage set in node A. Specifically, the PWM circuit 112 may control the off operation of the first switching transistor T17 based on the voltage set in node A, thereby controlling the time that the driving current provided by the PAM circuit 111 to the inorganic light-emitting element 120 flows through the inorganic light-emitting element 120.

As described above, when the PAM circuit 111 provides constant current to the inorganic light-emitting element 120, the inorganic light-emitting element 120 begins to emit light.

In this case, even if the transistor T5 and transistor T7 are turned on according to the Emi_PWM(n) signal, the second drive transistor T6 is turned off, so that the second driving voltage (VDD_PWM) is not applied to node C. Accordingly, the first switching transistor T17 continues to be turned on according to the SET(n) signal as described above, and the driving current provided by the PAM circuit 111 may flow through the inorganic light-emitting element 120.

Specifically, when the transistor T5 is turned on according to the Emi_PWM(n) signal, the second driving voltage (VDD_PWM) is applied to the source terminal of the second drive transistor T6 through the turned-on transistor T5.

For example, when a voltage between +10 [V] (black) and +15 [V] (full white) is used as the PWM data voltage as described above, and the threshold voltage of the second drive transistor T6 is assumed to be −1 [V], then a voltage between +9 [V] (black) and +14 [V] (full white) will be set in node A during the data setting section.

Subsequently, when the second driving voltage (e.g., +10 [V]) is applied to the source terminal of the second drive transistor T6 according to the Emi_PWM(n) signal, the voltage between the gate terminal and the source terminal of the second drive transistor T3 becomes a voltage above (−1 [V] to +4 [V]) the threshold voltage (−1 [V]) of the second drive transistor T3.

Therefore, unless the PWM data voltage corresponding to the black grayscale is set in node A, the second drive transistor T6 remains in the off state even when the second driving voltage (VDD_PWM) is applied to the source terminal of the second drive transistor T6, and the first switching transistor T17 remains in the turned-on state as long as the second drive transistor T6 remains in the off state, so that the inorganic light-emitting element 120 maintains light emission. (If the PWM data voltage corresponding to the black grayscale is set in node A, the second drive transistor T6 is turned on immediately when the second driving voltage is applied to the source terminal of the second drive transistor T6.)

However, when the voltage of node A changes according to the sweep signal Sweep(n) such that the voltage between the gate terminal and the source terminal of the second drive transistor T6 becomes below the threshold voltage (−1 [V]) of the second drive transistor T6, the second drive transistor T6 is turned on, and the second driving voltage (VDD_PWM, e.g., +10 [V]) is applied to node C, and the first switching transistor T17 is turned off. Accordingly, no more driving current flows through the inorganic light-emitting element 120, and the inorganic light-emitting element 120 stops emitting light.

Specifically, referring to FIG. 9B or FIG. 9C, it can be seen that while a low voltage is applied to the sub-pixel circuit 110 according to the Emi_PWM(n) signal, a linearly varying sweep signal Sweep(n), i.e., a linearly decreasing sweep voltage from a high voltage (e.g., +15 [V]) to a low voltage (e.g., +10 [V]), is applied to the sub-pixel circuit 110.

Since the voltage change of the sweep signal is coupled to node A through capacitor C1, the voltage of node A will also change according to the sweep signal.

When the voltage of node A decreases according to the sweep signal to a voltage corresponding to the sum of the second driving voltage and the threshold voltage of the second drive transistor T6 (i.e., when the voltage between the gate terminal and the source terminal of the second drive transistor T6 becomes below the threshold voltage of the second drive transistor T6), the second drive transistor T3 is turned on.

Accordingly, through the turned-on transistor T5, the second drive transistor T6, and the transistor T7, the second driving voltage, which is a high voltage, is applied to the gate terminal of node C, i.e., the first switching transistor T17, and the first switching transistor T17 is turned off.

As such, the PWM circuit 112 may control the light emission time of the inorganic light-emitting element 120 based on the PWM data voltage set in node A.

Meanwhile, after the end of the light-emitting section, it can be seen that the voltage of the sweep signal is restored to the voltage before the linear change, as shown in reference numeral 6 in FIG. 9B.

As described above, the voltage change of the sweep signal is coupled to node A through the capacitor C1, so that when the voltage of the sweep signal is restored as described above, the voltage of node A is also restored. Accordingly, the voltage of node A that has been linearly changed according to the sweep signal during the first light-emitting section among a plurality of light-emitting sections is restored according to the restoration of the voltage of the sweep signal before the next light-emitting section, i.e., the second light-emitting section, begins.

Specifically, the voltage of node A becomes the voltage corresponding to the sum of the PWM data voltage and the threshold voltage of the second drive transistor T6 during the data setting section, changes linearly with the change of the voltage of the sweep signal during the light-emitting section, and is restored to the voltage corresponding to the sum of the PWM data voltage and the threshold voltage of the second drive transistor T6 upon the restoration of the voltage of the sweep signal at the end of the light-emitting section Accordingly, the same light-emitting operation as the previous light-emitting section is possible in the next light-emitting section.

As described above, in order for the inorganic light-emitting element 120 to emit light during the light-emitting section, the first switching transistor T17 must first be in the turned-on state. However, as one of the plurality of light-emitting sections progresses, the second driving voltage is applied to node C and the first switching transistor T17 is turned off. Therefore, in order for the next light-emitting section to proceed, the voltage of node C needs to be reset to a low voltage in order to turn on the first switching transistor T17.

To this end, the driver 500, when the next light-emitting section begins, first applies a low voltage to the gate terminal of the transistor T8 again through the SET(n) signal, thereby applying a low voltage, Vset, to node C, causing the first switching transistor T17 to be turned on again.

After the first switching transistor T17 is turned on through the SET(n) signal, the driver 500 may apply a low voltage to the sub-pixel circuit 110 through the Emi_PWM (n) and Emi_PAM(n) signals and a sweep voltage to the sub-pixel circuit 110 through the Sweep(n) signal to control the light-emitting operation of the inorganic light-emitting element 120 in the next light-emitting section as described above.

Meanwhile, referring to FIG. 9B, it can be seen that when a low voltage is applied through the SP(n) signal line, the transistor T1 is turned on to force the high voltage (SW_VGH) of the sweep signal to be applied to node X. Through such an operation, sweep loading and resulting luminance unevenness and horizontal crosstalk between the sweep driver providing the sweep signal (Sweep(n)) and the sub-pixel circuit 110 can be minimized. The details of this are not relevant to the present disclosure, and will not be described further.

A specific embodiment has been described above with reference to FIGS. 9A to 9C. However, the method of setting a reset voltage to the anode terminal 121 of the inorganic light-emitting element 120 for each pixel (or for each sub-pixel) to compensate for a deviation in the electrical characteristics of the inorganic light-emitting element 120 or a deviation in the ground voltage is not limited to the embodiment described through FIGS. 9A through 9C. For example, the above embodiment may be applied to any driving method, such as an embodiment as in FIG. 2A, an embodiment in which the sub-pixel circuit 100 includes only the PAM circuit 111 to drive the display panel 100 in the PAM driving method, an embodiment in which the sub-pixel circuit 100 includes only the PWM circuit 112 to drive the display panel 100 in the PWM driving method, and the like, so that the deviations described above can be compensated for through the above.

Figure 10:
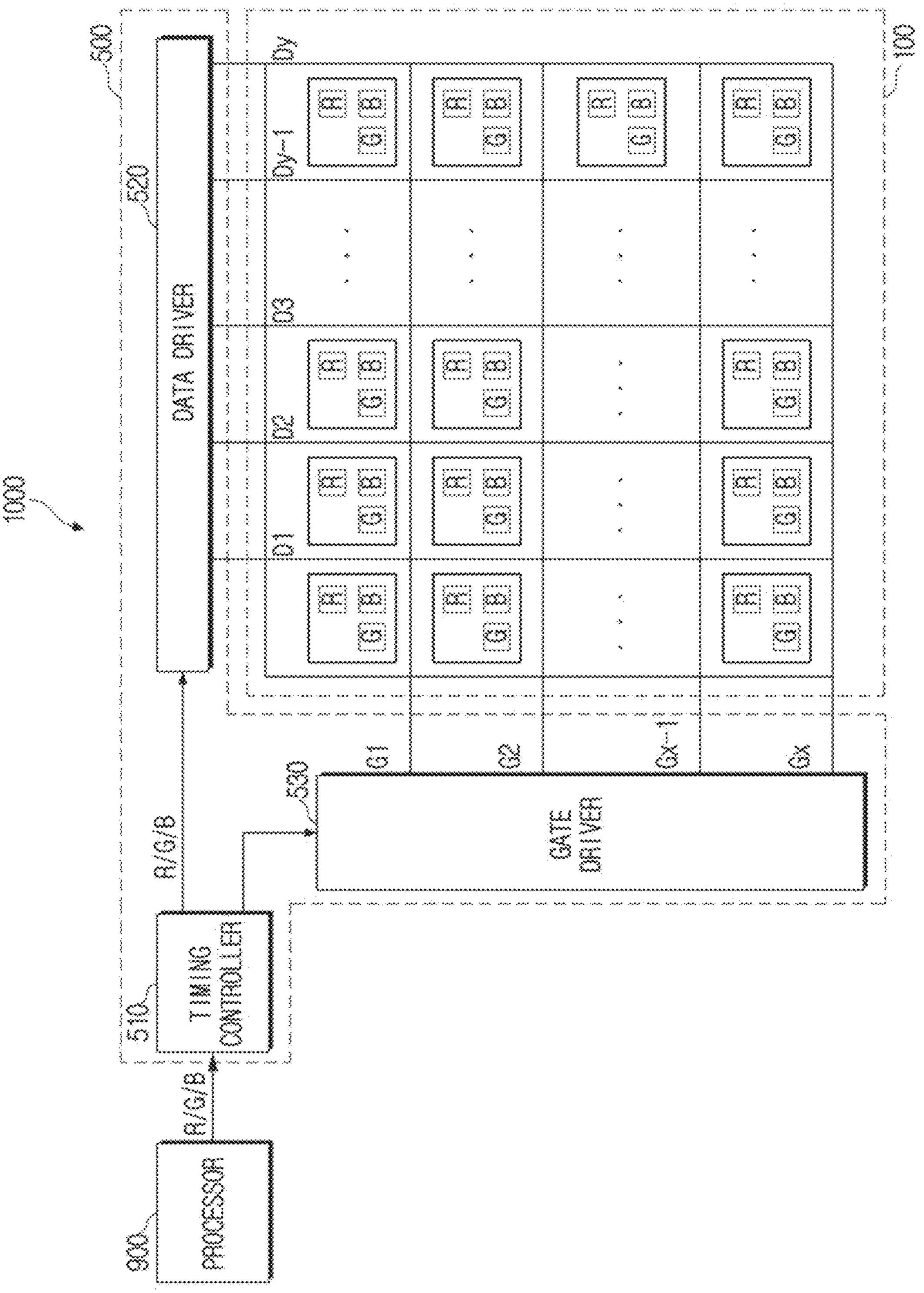
FIG. 10 is a block diagram of a display device according to an embodiment.

FIG. 10 is a block diagram of the display device 1000 according to an embodiment.

Referring to FIG. 10, the display device 1000 includes the display panel 100, the driver 500, and a processor 900.

The display panel 100 includes a plurality of pixels, each pixel including a plurality of sub-pixels.

Specifically, the display panel 100 may be formed in a matrix such that the gate lines (G1 to Gx) and the data lines (D1 to Dy) intersect each other, and each pixel may be formed in the region provided by the intersection.

In this case, each pixel may include three sub-pixels, such as R, G, and B, and each sub-pixel included in the display panel 100 may include the inorganic light-emitting element 120 of a corresponding color and the sub-pixel circuit 110, as described above.

Here, the data lines (D1 to Dy) are lines for applying the image data voltage or the reset voltage to each sub-pixel included in the display panel 100, and the gate lines (G1 to Gx) are lines for selecting the pixels (or sub-pixels) included in the display panel 100 by line. Accordingly, the image data voltage or the reset voltage applied through the data lines (D1 to Dy) may be applied to the pixel (or sub-pixel) of the row line selected through the gate signal.

In FIG. 10, for convenience of explanation, one set of data lines and gate lines, such as D1 to Dy and G1 to Gx, is shown, but the actual data lines or gate lines disposed on the display panel 100 may vary.

The driver 500 drives the display panel 100 under control of the processor 900, and may include a timing controller 510, a data driver 520, a gate driver 530, and the like.

The timing controller 510 may receive an input signal (IS), a horizontal synchronization signal (Hsync), a vertical synchronization signal (Vsync), a main clock signal (MCLK), and the like from the outside to generate an image data signal, a scanning control signal, a data control signal, a light emission control signal, and the like, and provide them to the display panel 100, the data driver 520, the gate driver 530, and the like.

In addition, the timing controller 510 may apply a control signal, i.e., a mux signal, to ta mux circuit for selecting each of the R, G, and B sub-pixels. Accordingly, a plurality of sub-pixels included in the pixels of the display panel 100 may be selected respectively through the mux circuit.

The data driver 520 (or source driver) is a means for generating data signals (in particular, an image data voltage, a reset voltage). The data driver 520 may apply the generated data signals to each sub-pixel circuit 110 of the display panel 100 through the data lines (D1 to Dy).

The gate driver 530 may generate various gate signals (e.g., VST, SP, Emi_PWM, Emi_PAM, Sweep, SET, etc.) for selecting and driving the pixels disposed in the matrix form in units of a row line, and may apply the generated gate signals to the display panel 100 through the gate lines (G1 to Gx). In particular, according to an embodiment, the gate driver 530 may apply the generated gate signals sequentially in the order of row lines, but is not limited thereto.

The driver 500 may further include a power IC for providing various DC voltages (e.g., the first driving voltage (VDD_PAM), the second driving voltage (VDD_PWM), a ground voltage VSS, a Vset voltage, a PAM voltage (VPAM_R/G/B), etc.) to the pixel circuit 110, a clock signal providing circuit for providing a clock signal to the gate driver circuit 530 or the data driver circuit 520, a mux circuit, an ESD protection circuit, and the like.

The processor 900 controls the overall operations of the display device 1000. In particular, the processor 900 may drive the display panel 100 by controlling the driver 500.

To this end, the processor 900 may be implemented as one or more of a central processing unit (CPU), a microcontroller, an application processor (AP), or a communication processor (CP), and an ARM processor.

Meanwhile, although FIG. 10 illustrates the processor 900 and the timing controller 510 as separate components, depending on the embodiment, it is possible to implement that only one configuration of either is included in the display device 1000 and the included configuration performs the functions of the other configuration. For example, the timing controller 510 may perform the functions of the processor 900.

Figure 11:
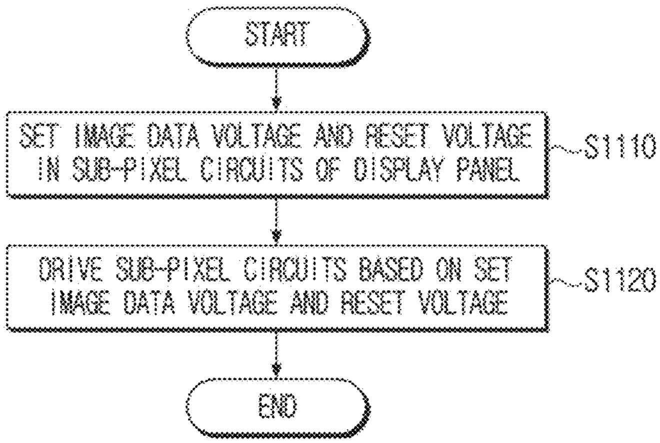
FIG. 11 is a flowchart illustrating a driving method of a display device according to an embodiment.

FIG. 11 is a flowchart illustrating a driving method of the display device 1000 according to an embodiment. The display device 1000 includes the display panel 100 including a pixel array in which pixels consisting of a plurality of inorganic light-emitting elements are disposed in a plurality of rows, and the sub-pixel circuits 110 corresponding to each of inorganic light-emitting elements 120 of the pixel array.

According to FIG. 11, the display device 1000 sets the image data voltage corresponding to the image frame in the sub-pixel circuits 110 in units of a plurality of row lines, and sets the reset voltage in the anode terminals 121 of the inorganic light-emitting elements 120 in units of a plurality of row lines (S1110).

In this case, the reset voltage may be a voltage for compensating for at least one of a deviation in the electrical characteristics of the inorganic light-emitting elements 120 or a deviation in the ground voltage applied to the cathode terminal 123 of the inorganic light-emitting elements 120. The reset voltage may be applied to the anode terminal 121 of the inorganic light-emitting elements 120 through a line separate from the line to which the image data voltage is applied.

Meanwhile, the display device 1000 may include the first data driver 521 providing an image data voltage and the second data driver 522 providing a reset voltage. In addition, each of the sub-pixel circuits may include the reset transistor 115 that applies the reset voltage provided from the second data driver 522 to the anode terminal 121 of the corresponding inorganic light-emitting element 120 while turned on.

According to an embodiment, the display device 1000 may apply a scan signal in units of a plurality of row lines in order to set the image data voltage in the sub-pixel circuits 110 in units of a plurality of row lines. In this case, the reset transistor 115 may be turned on based on the scan signal.

In addition, according to an embodiment, the display device 1000 may apply a first scan signal in units of a plurality of row lines in order to set the image data voltage in the sub-pixel circuits 110 in units of a plurality of row lines, and a second scan signal separate from the first scan signal in units of a plurality of row lines in order to turn on the reset transistor 115 in units of a plurality of row lines.

Meanwhile, the reset voltage set in the anode terminal 121 of the inorganic light-emitting elements 120 may be maintained by a parasitic capacitance formed between the anode terminal 121 and the cathode terminal 123 of each inorganic light-emitting element 120 until each inorganic light-emitting element 120 emits light.

Meanwhile, the inorganic light-emitting elements 120 may emit light according to the driving current provided from the sub-pixel circuits 110. Each of the sub-pixel circuits 110 may include at least one of the pulse amplitude modulation (PAM) circuit 111 for controlling the magnitude of the driving current based on the image data voltage, or the pulse width modulation (PWM) circuit 112 for controlling the pulse width of the driving current based on the image data voltage.

In addition, the PAM circuit 111 and PWM circuit 112 also include the drive transistors T6, T16, and the threshold voltage of the drive transistors T6, T16 may be compensated for when the image data voltage is set in the sub-pixel circuits 110.

Subsequently, the display device 1000 drives the sub-pixel circuits 110 to cause the inorganic light-emitting elements 120 to emit light based on the set image data voltage and reset voltage (S1120).

According to the various embodiments described above, it is possible to prevent the wavelength of the light emitted by the inorganic light-emitting element from varying according to the grayscale. In addition, it is possible to easily compensate for image stains that may appear on the screen due to threshold voltage deviations between the drive transistors. Further, color correction becomes easier. In addition, the power consumption for driving the display panel can be reduced. Furthermore, the effect of a drop in the driving voltage on the setting process of the data voltage can be compensated for. Also, it is possible to improve the problems of luminance unevenness and horizontal crosstalk due to a sweep load. In addition, a sufficient dynamic range can be secured. Further, it is possible to prevent the problem that the luminance uniformity is degraded when expressing grayscale (especially, low grayscale) due to a deviation in the electrical characteristics of the inorganic light-emitting element 120 or a deviation in the ground voltage VSS according to the position of the inorganic light-emitting element 120 on the display panel 100.

Meanwhile, the above-described various embodiments may be implemented as software including instructions stored in machine-readable storage media, which can be read by machine (e.g.: computer). The machine refers to a device that calls instructions stored in a storage medium, and can operate according to the called instructions, and the device may include the display device 1000 according to the aforementioned embodiments.

In case an instruction is executed by a processor, the processor may perform a function corresponding to the instruction by itself, or by using other components under its control. The instruction may include a code that is generated or executed by a compiler or an interpreter. The machine-readable storage medium may be provided in the form of a non-transitory storage medium. Here, the term 'non-transitory' means that the storage medium is tangible without including a signal, and does not distinguish whether data are semi-permanently or temporarily stored in the storage medium.

According to an embodiment, the above-described methods according to the various embodiments may be included and provided in a computer program product. The computer program product may be traded as a product between a seller and a purchaser. The computer program product may be distributed in a form of a storage medium (e.g., a compact disc read only memory (CD-ROM)) that may be read by the machine or online through an application store (e.g., Play-Store™). In case of the online distribution, at least a portion of the computer program product may be at least temporarily stored in a storage medium such as a memory of a server of a manufacturer, a server of an application store, or a relay server or be temporarily generated.

The components (e.g., modules or programs) according to various embodiments described above may include a single entity or a plurality of entities, and some of the corresponding sub-components described above may be omitted or other sub-components may be further included in the various embodiments. Alternatively or additionally, some components (e.g., modules or programs) may be integrated into one entity and perform the same or similar functions performed by each corresponding component prior to integration. Operations performed by the modules, the programs, or the other components according to the various embodiments may be executed in a sequential manner, a parallel manner, an iterative manner, or a heuristic manner, or at least some of the operations may be performed in a different order or be omitted, or other operations may be added.

The above description is merely an illustrative description of the technical idea of the present disclosure, and those with ordinary skill in the art to which the present disclosure pertains may make various modifications and variations without departing from the essential characteristics of the present disclosure. In addition, the embodiments according to the present disclosure are not intended to limit the technical idea of the present disclosure but are intended to explain, and the scope of the technical idea of the present disclosure is not limited by these embodiments. Therefore, the protection scope of the present disclosure should be interpreted by the claims below, and all technical ideas within the equivalent scope should be interpreted as being included in the scope of the rights of the present disclosure.

What is claimed is:

1. A display device comprising:

a display panel comprising:

a pixel array comprising pixels arranged in a plurality of row lines, the pixels comprising a plurality of inorganic light-emitting elements; and sub-pixel circuits corresponding to the plurality of inorganic light-emitting elements of the pixel array; and a driver configured to:

obtain a reset voltage by measuring a voltage value at which a stain is removed after displaying a monochromatic test image on the display panel;

store the reset voltage in the display device;

set an image data voltage corresponding to an image frame in sub-pixels of the plurality of row lines in the sub-pixel circuits;

apply the stored reset voltage in the sub-pixels of the plurality of row lines in an anode terminal of the inorganic light-emitting elements; and drive the sub-pixel circuits so that an inorganic light-emitting element, of the inorganic light-emitting elements, emits light based on the set image data voltage and the stored reset voltage, wherein the stored reset voltage is a voltage for compensating for at least one of an electrical characteristic deviation of the inorganic light-emitting element or a ground voltage deviation applied to a cathode terminal of the inorganic light-emitting elements.

2. The display device as claimed in claim 1, wherein the stored reset voltage is applied to the anode terminal of the inorganic light-emitting element through a line separate from a line through which the image data voltage is applied.

3. The display device as claimed in claim 1, wherein the driver comprises:

a first data driver configured to provide the image data voltage; and a second data driver configured to provide the stored reset voltage.

4. The display device as claimed in claim 3, wherein each of the sub-pixel circuits comprises a reset transistor configured to apply the stored reset voltage provided by the second data driver to the anode terminal of the inorganic light-emitting elements while turned on.

5. The display device as claimed in claim 4, wherein the driver is further configured to set the image data voltage in the sub-pixels of the plurality of row lines in the sub-pixel circuits by applying a scan signal in the sub-pixels of the plurality of row lines; and wherein the reset transistor is turned on based on the scan signal.

6. The display device as claimed in claim 4, wherein the driver is further configured to:

set the image data voltage in the sub-pixels of the plurality of row lines in the sub-pixel circuits by applying a first scan signal in the sub-pixels of the plurality of row lines; and turn on the reset transistor in the sub-pixels of the plurality of row lines by applying a second scan signal separate from the first scan signal in the sub-pixels of the plurality of row lines.

7. The display device as claimed in claim 1, wherein the stored reset voltage applied in the anode terminal of the inorganic light-emitting element is maintained by parasitic capacitance formed between the anode terminal and the cathode terminal of each inorganic light-emitting element until each inorganic light-emitting element emits light.

8. The display device as claimed in claim 1, wherein the inorganic light-emitting element is configured to emit light according to driving current provided from the sub-pixel circuits, and wherein each of the sub-pixel circuits comprises at least one of a Pulse Amplitude Modulation (PAM) circuit for controlling a magnitude of the driving current based on the image data voltage or a Pulse Width Modulation (PWM) circuit for controlling a pulse width of the driving current based on the image data voltage.

9. The display device as claimed in claim 8, wherein the PAM circuit comprises a first drive transistor and the PWM circuit comprises a second drive transistor, and wherein a first threshold voltage of the first drive transistor is compensated when the image data voltage is set in the sub-pixel circuits, and wherein a second threshold voltage of the second drive transistor is compensated when the image data voltage is set in the sub-pixel circuits.

10. A controlling method of a display device comprising a display panel, the display panel comprising a pixel array comprising pixels that are arranged in a plurality of row lines and comprise a plurality of inorganic light-emitting elements, and sub-pixel circuits corresponding to the plurality of inorganic light-emitting elements of the pixel array, the controlling method comprising:

obtaining a reset voltage by measuring a voltage value at which a stain is removed after displaying a monochromatic test image on the display panel;

storing the reset voltage in the display device;

setting an image data voltage corresponding to an image frame in sub-pixels of the plurality of row lines in the sub-pixel circuits, and applying the stored reset voltage in the sub-pixels of the plurality of row lines in an anode terminal of the inorganic light-emitting elements; and driving the sub-pixel circuits so that an inorganic light-emitting element, of the plurality of inorganic light-emitting elements, emits light based on the set image data voltage and the stored reset voltage, wherein the stored reset voltage is a voltage for compensating for at least one of an electrical characteristic deviation of the inorganic light-emitting element or a ground voltage deviation applied to a cathode terminal of the inorganic light-emitting elements.

11. The controlling method as claimed in claim 10, wherein the stored reset voltage is applied to the anode terminal of the inorganic light-emitting element through a line separate from a line through which the image data voltage is applied.

12. The controlling method as claimed in claim 10, wherein the display device comprises:

a first data driver configured to provide the image data voltage; and a second data driver configured to provide the stored reset voltage.

13. The controlling method as claimed in claim 12, wherein each of the sub-pixel circuits comprises a reset transistor configured to apply the stored reset voltage provided from the second data driver to the anode terminal of the inorganic light-emitting elements while turned on.

14. The controlling method as claimed in claim 13, wherein the setting comprises:

applying a scan signal in the sub-pixels of the plurality of row lines to set the image data voltage in the sub-pixels of the plurality of row lines in the sub-pixel circuits; and wherein the reset transistor is turned on based on the scan signal.

15. The controlling method as claimed in claim 13, wherein the setting comprises:

applying a first scan signal in the sub-pixels of the plurality of row lines to set the image data voltage in the sub-pixels of the plurality of row lines in the sub-pixel circuits; and applying a second scan signal separate from the first scan signal in the sub-pixels of the plurality of row lines to turn on the reset transistor in the sub-pixels of the plurality of row lines.

* * * * *